US011755966B2

(12) United States Patent
Baldo

(10) Patent No.: US 11,755,966 B2
(45) Date of Patent: Sep. 12, 2023

(54) MODELING FIELD IRRIGATION WITH REMOTE SENSING IMAGERY

(71) Applicant: Indigo Ag, Inc., Boston, MA (US)

(72) Inventor: Elisabeth Florence Ilona Baldo, Somerville, MA (US)

(73) Assignee: Indigo Ag, Inc., Charlestown, MA (US)

( * ) Notice: Subject to any disclaimer, the term of this patent is extended or adjusted under 35 U.S.C. 154(b) by 0 days.

(21) Appl. No.: 17/704,773

(22) Filed: Mar. 25, 2022

(65) Prior Publication Data

US 2022/0210987 A1 Jul. 7, 2022

Related U.S. Application Data

(63) Continuation of application No. PCT/US2020/052706, filed on Sep. 25, 2020.

(Continued)

(51) Int. Cl.
*G06Q 10/04* (2023.01)
*G06V 10/82* (2022.01)
(Continued)

(52) U.S. Cl.
CPC .......... *G06Q 10/04* (2013.01); *A01G 25/16* (2013.01); *G06Q 50/02* (2013.01); *G06V 10/82* (2022.01); *G06V 20/188* (2022.01)

(58) Field of Classification Search
CPC ........ G06Q 10/04; G06Q 50/02; G06Q 10/06; G06Q 10/067; A01G 25/16; G06V 10/82;

(Continued)

(56) References Cited

U.S. PATENT DOCUMENTS 6,422,508 B1 7/2002 Barnes
8,965,812 B2 2/2015 Linville
(Continued)

FOREIGN PATENT DOCUMENTS

WO WO-2021/062147 A1 4/2021

OTHER PUBLICATIONS

Braaten., "LandsatLinkr 0.1.4 User Guide," Retrieved on internet <https://manualzz.com/doc/7476279/landsatlinkr-0.1.4-user-guide>: 42 pages (2015).

(Continued)

*Primary Examiner* — Tejal Gami
(74) *Attorney, Agent, or Firm* — Erik A. Huestis; Sameer K. Pai; Foley Hoag LLP

(57) ABSTRACT

Detection of field irrigation through remote sensing is provided. In various embodiments, at least one time series of index rasters for a geographic region is read. A time series of weather data for the geographic region is read. The at least one time series of index rasters and the time series of weather data are divided into a plurality of time windows. The at least one time series of index rasters is composited within each of the plurality of time windows, yielding a composite index raster for each of the at least one time series of index rasters in each of the plurality of time windows. The time series of weather data is composited within each of the plurality of time windows, yielding composite weather data in each of the plurality of time windows. The composite index rasters and composite weather data are provided to a trained classifier. A pixel irrigation label for each pixel of the composite index rasters is obtained therefrom. Each pixel irrigation label indicates the presence or absence of irrigation at the associated pixel.

19 Claims, 24 Drawing Sheets

Related U.S. Application Data

(60) Provisional application No. 62/907,199, filed on Sep. 27, 2019.

(51) Int. Cl.
*G06V 20/10* (2022.01)
*A01G 25/16* (2006.01)
*G06Q 50/02* (2012.01)

(58) Field of Classification Search
CPC .. G06V 20/188; G06F 18/24137; Y02A 90/10
See application file for complete search history.

(56) References Cited

U.S. PATENT DOCUMENTS

| | | |
|---|---|---|
| 9,113,590 B2 | 8/2015 | Johnson |
| 9,381,646 B1 | 7/2016 | Fryshman |
| 9,489,576 B2 | 11/2016 | Johnson et al. |
| 9,519,861 B1 | 12/2016 | Gates et al. |
| 9,563,945 B2 | 2/2017 | Fryshman |
| 9,582,002 B2 | 2/2017 | Cavender-Bares |
| 9,582,873 B2 | 2/2017 | Ulman |
| 9,629,306 B2 | 4/2017 | Sauder et al. |
| 9,658,201 B2 | 5/2017 | Redden et al. |
| 9,745,060 B2 | 8/2017 | O'Connor et al. |
| 9,756,844 B2 | 9/2017 | Groeneveld |
| RE46,968 E | 7/2018 | Linville |
| RE47,742 E | 11/2019 | Linville |
| 2013/0332205 A1 | 12/2013 | Friedberg et al. |
| 2014/0095261 A1 | 4/2014 | Johnson |
| 2014/0222374 A1 | 8/2014 | Lock et al. |
| 2014/0263822 A1 | 9/2014 | Malveaux |
| 2016/0050840 A1 | 2/2016 | Sauder et al. |
| 2016/0071410 A1 | 3/2016 | Rupp et al. |
| 2016/0073573 A1 | 3/2016 | Ethington et al. |
| 2016/0157414 A1 | 6/2016 | Ackerman et al. |
| 2016/0180473 A1 | 6/2016 | Groeneveld |
| 2016/0216245 A1 | 7/2016 | Sutton |
| 2016/0232621 A1 | 8/2016 | Ethington et al. |
| 2016/0302351 A1 | 10/2016 | Schildroth et al. |
| 2016/0309646 A1 | 10/2016 | Starr et al. |
| 2017/0083747 A1 | 3/2017 | Guan et al. |
| 2017/0090068 A1 | 3/2017 | Xiang et al. |
| 2017/0105335 A1 | 4/2017 | Xu et al. |
| 2017/0109395 A1 | 4/2017 | Farah |
| 2017/0112043 A1 | 4/2017 | Nair et al. |
| 2017/0124463 A1 | 5/2017 | Chen et al. |
| 2017/0161627 A1 | 6/2017 | Xu et al. |
| 2017/0168157 A1 | 6/2017 | Hagerman et al. |
| 2017/0169523 A1 | 6/2017 | Xu et al. |
| 2017/0177938 A1 | 6/2017 | Papanikolopoulos et al. |
| 2017/0196171 A1 | 7/2017 | Xu et al. |
| 2017/0199528 A1 | 7/2017 | Detweiler et al. |
| 2017/0206415 A1 | 7/2017 | Redden |
| 2017/0213141 A1 | 7/2017 | Xu et al. |
| 2017/0228475 A1 | 8/2017 | Aldor-Noiman et al. |
| 2017/0231213 A1 | 8/2017 | Gordon et al. |
| 2017/0258005 A1 | 9/2017 | Cutter |
| 2017/0270446 A1 | 9/2017 | Starr et al. |
| 2018/0049043 A1 | 2/2018 | Hoffberg |
| 2018/0070527 A1 | 3/2018 | Richt |
| 2018/0075545 A1 | 3/2018 | Richt |
| 2019/0019008 A1 | 1/2019 | Guan et al. |
| 2019/0050948 A1 | 2/2019 | Perry et al. |
| 2022/0342536 A1 | 10/2022 | Bontjes |
| 2022/0343229 A1 | 10/2022 | Gruber et al. |

OTHER PUBLICATIONS

International Search Report and Written Opinion for International Application No. PCT/US2020/052706 dated Dec. 7, 2020.

Xie et al., "Mapping irrigated cropland extent across the conterminous United States at 30 m resolution using a semi-automatic training approach on Google Earth Engine," ISPRS Journal of Photogrammetry and Remote Sensing, 155:136-149 (2019).

Xie et al., "New field-level mapping of irrigated croplands across the United States," Gibbs Lab, Research brief prepared Nov. 1, 2018.

Zhang et al., "Mapping paddy rice planting areas through time series analysis of MODIS land surface temperature and vegetation index data," ISPRS J Photogramm Remote Sens., 106: 157-171 (33 pages)(2015).

MODELING FIELD IRRIGATION WITH REMOTE SENSING IMAGERY

CROSS-REFERENCE TO RELATED APPLICATIONS

This application is a continuation of International Application No. PCT/US2020/052706, filed Sep. 25, 2020, which claims the benefit of U.S. Provisional Application No. 62/907,199, filed Sep. 27, 2019, each of which is hereby incorporated by reference in its entirety.

BACKGROUND

Embodiments of the present disclosure relate to analysis of remote sensing data for agricultural applications, and more specifically, to modeling field irrigation with remote sensing imagery.

BRIEF SUMMARY

According to embodiments of the present disclosure, methods of and computer program products for irrigation labeling are provided. At least one time series of index rasters for a geographic region is read. A time series of weather data for the geographic region is read. The at least one time series of index rasters and the time series of weather data are divided into a plurality of time windows. The at least one time series of index rasters is composited within each of the plurality of time windows, yielding a composite index raster for each of the at least one time series of index rasters in each of the plurality of time windows. The time series of weather data is composited within each of the plurality of time windows, yielding composite weather data in each of the plurality of time windows. The composite index rasters and composite weather data are provided to a trained classifier. A pixel irrigation label for each pixel of the composite index rasters is obtained therefrom. Each pixel irrigation label indicates the presence or absence of irrigation at the associated pixel.

In various embodiments, a plurality of field regions within the geographic region is read, and a consensus irrigation label is determined for each of the plurality of field regions based on the pixel irrigation labels within the respective field region. In some embodiments, an uncertainty of each consensus irrigation label is determined based on the ratio of pixel irrigation labels indicating the presence of irrigation to pixel irrigation labels indicating absence of irrigation within the respective field region.

In various embodiments, a time series of surface reflectance rasters for the geographic region is read, and for each of the surface reflectance rasters, at least one index raster is determined, yielding the at least one time series of index rasters.

In various embodiments, the plurality of time windows are consecutive.

In various embodiments, the trained classifier comprises an ensemble model. In some embodiments, the ensemble model comprises a plurality of decision trees. In some embodiments, the ensemble model comprises a plurality of boosted tree models.

In various embodiments, the time series of surface reflectance rasters comprises satellite data. In various embodiments, the time series of surface reflectance rasters spans a growing season in the geographic region.

In various embodiments, the at least one index raster comprises a normalized difference vegetation index raster. In various embodiments, the at least one index raster comprises a land surface water index raster. In various embodiments, the at least one index raster comprises a mean brightness raster.

In various embodiments, the time series of weather data comprises accumulated precipitation. In various embodiments, the time series of weather data comprises growing degree days.

In various embodiments, the plurality of consecutive time windows corresponds to early, mid-, and late phases of a growing season in the geographic region.

In various embodiments, compositing comprises averaging the at least one time series of index rasters within each of the plurality of time windows.

DETAILED DESCRIPTION

Figure 1:
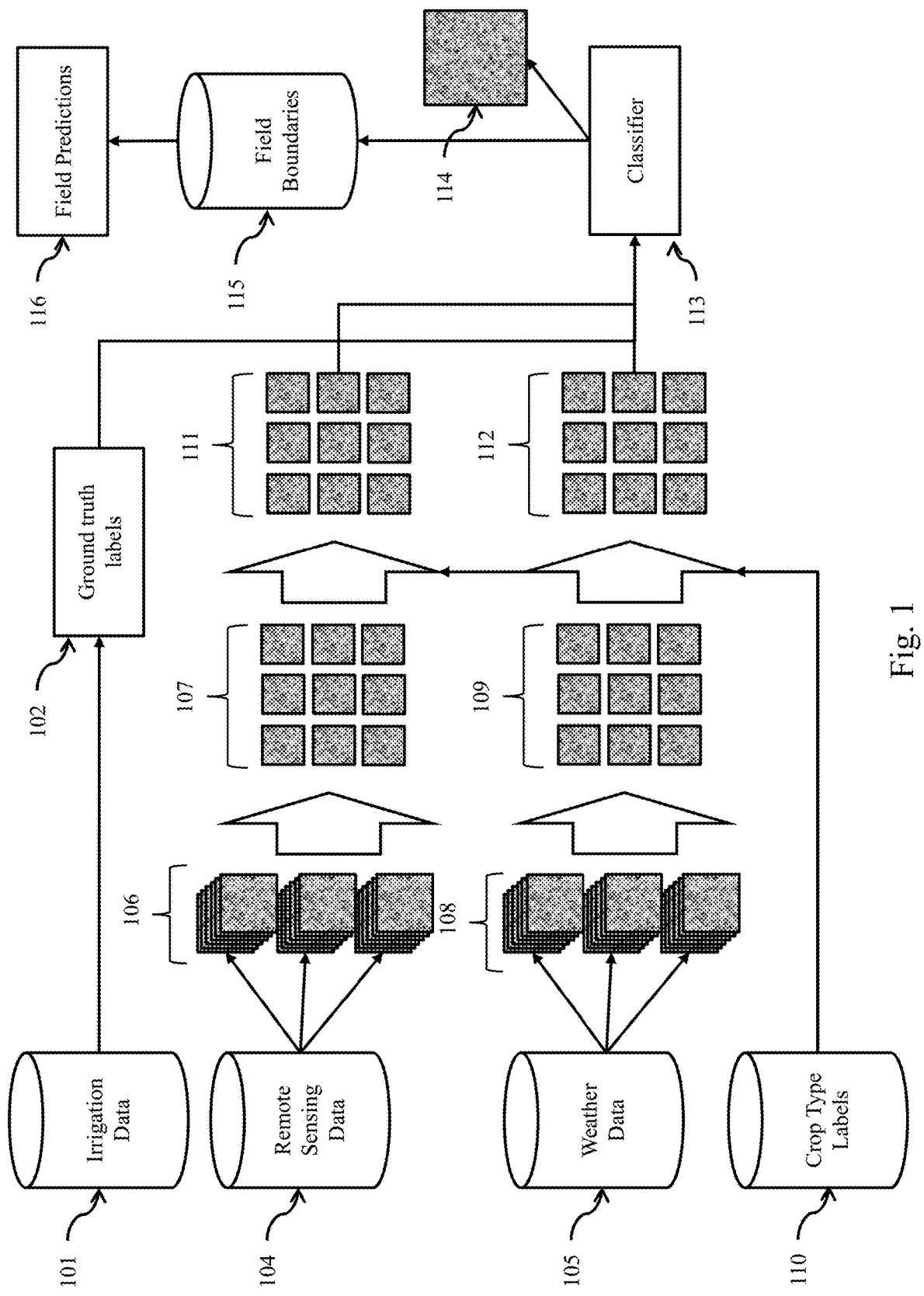
FIG. 1 is a schematic view of a low-latency global framework for identifying irrigated areas at fine spatial resolution according to embodiments of the present disclosure.

The UN's Food and Agriculture Organization reports that irrigated agriculture accounts for 20 percent of the world's cultivated land and 40% of the produced food, with 324 MM hectares equipped for irrigation and 275 MM actually irrigated. Despite its prevalence, mapping irrigation at high resolution is challenging due to limited data availability and aggregation to large administrative regions, limiting its utility for field-scale analyses.

Summaries of irrigation practices are made available publicly by the USDA, but these summaries are based on manual data collection, and so lack comprehensive coverage, lack field-specific data, data, and are not necessarily up to date. Moreover, no datasets of field or sub-field level irrigated land is available over the continental US.

Accordingly, there remains a need for automated and timely determination of irrigation at high enough resolution to enable field level analysis. The present disclosure provides for automated prediction and display of irrigation practices from medium to high resolution (≤30 m scale) remote sensing imagery, for example using the Harmonized Landsat Sentinel (HLS) sensor. In general, resolution on the order of tens of meters is considered medium resolution, while resolution on the order of meters is considered high resolution.

As set out below, the present disclosure enables pixel level mapping of remote sensing imagery. When combined with field delineation (for example using the methods set out in commonly assigned U.S. Provisional Application No. 62/892,110 and PCT Application No. PCT/US2020/048188), the methods set out herein enable field-level mapping. By training a model on field-level irrigation labels across multiple years and irrigation equipment, a robust approach is developed suitable for medium to high spatial resolutions. In various embodiments, a boosted tree approach is employed, which minimizes overfitting and increase interpretability. This enables the irrigation layer created by the model to be used for field-level and sub-field level decision making, in addition to making aggregated summaries. Although various examples are provided herein in terms of HLS, it will be appreciated that the methods described herein are applicable to multiple data sources with various temporal frequencies. Moreover, while various examples are provided with respect to seasonal prediction, it will be appreciated that the in-season (e.g., monthly) models may be trained, allowing more detailed predictions.

In alternative approaches, other satellite data sets may be used. For example, Landsat may be used in place of HLS (which is only available since 2016). However, Landsat lacks the high temporal frequency of HLS and so is less suited for in-season predictions. In addition, HLS merges the information from two satellites, Landsat and Sentinel 2. The calibration and corrections applied result in a high quality product, in particular with respect to (NIR). Similarly, using aggregated annual data precludes conclusions on in-season irrigation status.

In other alternative approaches, training data are based on regional aggregations of center pivots over large regions (like states or counties). Such approaches are useful for regional aggregation, but do not provide the precision necessary to provide field or subfield-level irrigation estimates.

Referring to FIG. 1, a low-latency global framework is illustrated that is capable of identifying irrigated areas at fine spatial resolution via predictive modeling. Irrigation data 101 are used to determine ground truth labels 102 for the training of classifier 103. In an exemplary embodiment, three years of proprietary irrigation data (2016-2019) over corn, cotton, and soybean fields farmed in the U.S. were transformed into ground truth labels. Features are extracted from remote sensing data 104 (such as the Harmonized Landsat Sentinel-2 (HLS) product) and combined with weather data 105 (for example, from the gridMET dataset).

In various embodiments, the remote sensing data is processed to determine one or more indices 106 for each point in time for which data is available at each pixel of the input rasters from remote sensing data 104. In some embodiments, surface reflectance images (e.g., from HLS) are processed to create a three-band product consisting of normalized difference vegetation index (NDVI), land surface water index (LSWI), and mean brightness (BRT). These three indices represent the three principal axes of variability of optical data, and may be referred to as greenness, wetness, and brightness. In the example shown, each of three indices contains a plurality of snapshots in time. Each snapshot is a raster, or image, whose pixel intensity indicates the index value.

In alternative embodiments, different indices are selected, resulting in a different number of bands. For example, in some embodiments, the brightness band described above is omitted. Brightness, greenness, and wetness are generally the most dominant modes of variability for optical remote sensing bands. However, it will be appreciated that a variety of different combinations of bands and specific computation of bands may be used for field delineation according to the present disclosure. For example, Enhanced Vegetation Index (EVI) or EVI2 may be used in place of NDVI.

Remote sensing data may be available on an irregular schedule, for example due to orbital periods of satellites within a given constellation. The HLS source images are provided irregularly in time, and may contain gaps which propagate into the indices. To address this variability, in some embodiments, the index images are composited within pre-specified time windows, enabling delivery of a small number of high-value variables for use in the downstream algorithms. It will be appreciated that various techniques may be used to composite the source images prior to index computation. However, compositing the index images is advantageous as it reduces noise and lowers the dimensionality of the problem, thereby enabling more efficient computation.

In some embodiments, the predetermined time windows correspond to phases of the growing season (phenology periods). In some embodiments, the time windows correspond to the early growing season, the mid-season, and the late growing season for a given crop. In an exemplary embodiment, a first window spans April and May, a second window spans June and July, and a third window spans August and September. It will be appreciated that these exemplary windows are calibrated to spring crops in the continental United States. Time windows may be shifted for use in different geographies depending on weather events or farming practices (such as crop rotation and irrigation practices). Time windows may be consecutive (for example, for most spring crops in the continental US) or non-consecutive (for example for winter crops such as winter wheat). Winter crops such as winter wheat may be covered with snow for many months between planting and harvest. During this dormancy period, where the crop is covered by snow, the reflective indices captured might not be relevant to the model, while earlier or later time windows would be more informative for the methods disclosed herein.

In various embodiments, compositing comprises performing a temporal linear interpolation to reduce potential bias from having the distribution of measurements in time significantly different for different places. In some such embodiments, linear interpolation is performed between available observations, which due to clouds and overpass constraints, may not be evenly distributed in time. After interpolation, for each pixel, the average in time within a window is taken. In an exemplary embodiment in which three indices are assessed over three time windows, the result is a nine band (3 indices×3 windows) image stack 107.

It will be appreciated that the above process may be performed for a global data set, or only for certain areas of interest. In some embodiments, the resulting image stack is downsampled to a predetermined resolution in order to limit the overall storage size necessary to maintain the image stacks. In some embodiments, the target resolution is 0.15 degrees. This resolution allows for storage of a global dataset while providing sufficient resolution for further downstream processing.

In an exemplary embodiment, the above process is applied to HLS to derive composite images of vegetation and water indices at a 30 m spatial resolution for early-, middle- and late-growing-season time periods, which correspond to the phenology windows of spring crops in the continental US. In this exemplary embodiment, NDVI, EVI2, Brightness, and NDWI indices are used. However, as set out herein, alternative indices may be used in various embodiments.

A similar process is applied to weather data 105 in order to determine one or more values 108 for each point in time for which data is available in weather data 105. In some embodiments, weather data 105 comprises rasters, with weather values provided for each pixel. In some embodiments, weather data 105 comprises data aggregated over a larger region, such as a county. In embodiments where data is provided over regions such as counties, subsampling is applied to arrive at a raster, either prior to compositing, or afterwards. In some embodiments, cumulated precipitation (e.g., precipitation in millimeters, abbreviated PMM) and growing degree days (GDD) are processed to create a two-band product. In some embodiments, an average, such as a ten-year average makes up an additional band. In the example shown, each of three values contains a plurality of snapshots in time. Each snapshot contains either regional information, or a raster whose pixel intensity indicates the magnitude of the value. In addition to PMM and GDD, alternative embodiments may include additional or substitute weather data, such as Palmer Drought Severity Index (PDSI), evaporation, or other indices known in the art.

In some embodiments, images 108 are composited within pre-specified time windows, enabling delivery of a small number of high-value variables for use in the downstream algorithms. In some embodiments, the predetermined time windows correspond to phases of the growing season (phenology periods). In some embodiments, the time windows correspond to the early growing season, the mid-season, and the late growing season for a given crop. In an exemplary embodiment, a first window spans April and May, a second window spans June and July, and a third window spans August and September. It will be appreciated that these windows are suitable for spring crops in the continental US, and would be redefined for use in other geographies and other crops (e.g., winter crops).

In various embodiments, compositing comprises performing a temporal linear interpolation to reduce potential bias from having the distribution of measurements in time significantly different for different places. In some such embodiments, linear interpolation is performed between available observations. After interpolation, for each pixel or region, the average in time within a window is taken. In an exemplary embodiment in which three values are assessed over three time windows, the result is a nine band (3 indices×3 windows) image stack 109.

It will be appreciated that the above process may be performed for a global data set, or only for certain areas of interest. In some embodiments, the resulting image stack is downsampled to a predetermined resolution in order to limit the overall storage size necessary to maintain the image stacks. In some embodiments, the target resolution is 0.15 degrees. This resolution allows for storage of a global dataset while providing sufficient resolution for further downstream processing.

In an exemplary embodiment, the above process is applied to GridMet data to determine two-month composites of cumulated precipitation and growing degree days (GDD) and ten-year averages. In an exemplary embodiment, 30 m spatial resolution composites are determined for early-, middle- and late-growing-season time periods, which correspond to the phenology windows of spring crops in the continental US. These weather data serve as both a proxy for geography and as a complement to the information contained in the HLS-based water index.

In various embodiments, crop type labels 110 are used to filter composites 107, 108 to only pixels containing crops of interest, yielding filtered composites 111, 112. In an exemplary embodiment, crop type labels 110 are drawn from the NASS Cropland Data Layer (CDL). This layer may be referred to as a crop mask. For 2008-2018, the CDL data may be used for the year in question. For years prior to 2008, an alternating rotation of crops is assumed, and thus 2008's map is used for 2006 and 2004 and 2009's map is used for 2007, 2005 and 2003. This serves as the best proxy for what would have been. For the current year, 2019, the 2017 CDL is used to build the crop mask. However, this may be replaced in-season with a mask built from satellite-based crop type determination methods. In an exemplary embodiment, the NASS Cropland Data Layer (CDL) is used to filter images for corn, cotton, and soybean pixels for a given year.

Classifier 113 is trained using the pixels in filtered raters 111, 112 and ground truth labels 102 to predict irrigation status.

In some embodiments, the classifier is a random decision forest. However, it will be appreciated that a variety of other classifiers are suitable for use according to the present disclosure, including linear classifiers, support vector machines (SVM), or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

In various embodiments, the learning system employs Extreme Gradient Boosting (XGBoost) for predicting county scale yields. This algorithm is employed in various embodiments because: 1) its tree-based structure can handle the non-linear relationships between predictors and outcomes and 2) it automatically captures interactions among features well, so they do not need to be pre-computed. Additionally, XGBoost is computationally efficient relative to similar machine learning methods.

Once trained, classifier 113 predicts irrigation status on a pixel level based on input rasters, which allows for the creation of large-scale irrigation maps 114 without requiring field boundaries. When field boundaries 115 are available, the pixel-level predictions can be aggregated to field-level predictions 116. In some embodiments, field predictions are determined via a voting procedure, yielding a field-level prediction with an immediate, and interpretable uncertainty. In some embodiments, the number of pixels classified as irrigated are counted, and then compared to predetermined ratio to determine whether a field should be classified as irrigated. In some embodiments, a ratio of 0.2 or less is considered not irrigated, while a ratio of 0.8 or higher is considered irrigated. However, it will be appreciated that a variety of ratios may be used in various embodiments, for example, not-irrigated ratios of 0.1, 0.2, 0.3, 0.4, 0.5, or irrigated ratios of 0.5, 0.6, 0.7, 0.8, or 0.9. Pixel-level predictions are also valuable for their ability to respond to subfield variability.

As set out herein, in various embodiments, field irrigation mapping takes advantage of both the HLS medium resolution satellite imagery and the automated field delineation product to generate yearly maps of irrigated and dryland spring crops fields. Aggregating the pixel-level model predictions to field-level allows display of the uncertainty surrounding the estimation of the irrigation status. In addition, the model may be trained over multiple years and is agnostic to the geography, which makes it transferable to a global application.

In some embodiments, separate models are constructed on a rolling basis. That is, the models are updated as new data become available (e.g., from day to day). Thus, in some embodiments a daily, independent model approach is adopted. Independent daily models capture the varying importance and relevance of features as the season progresses.

Figure 2:
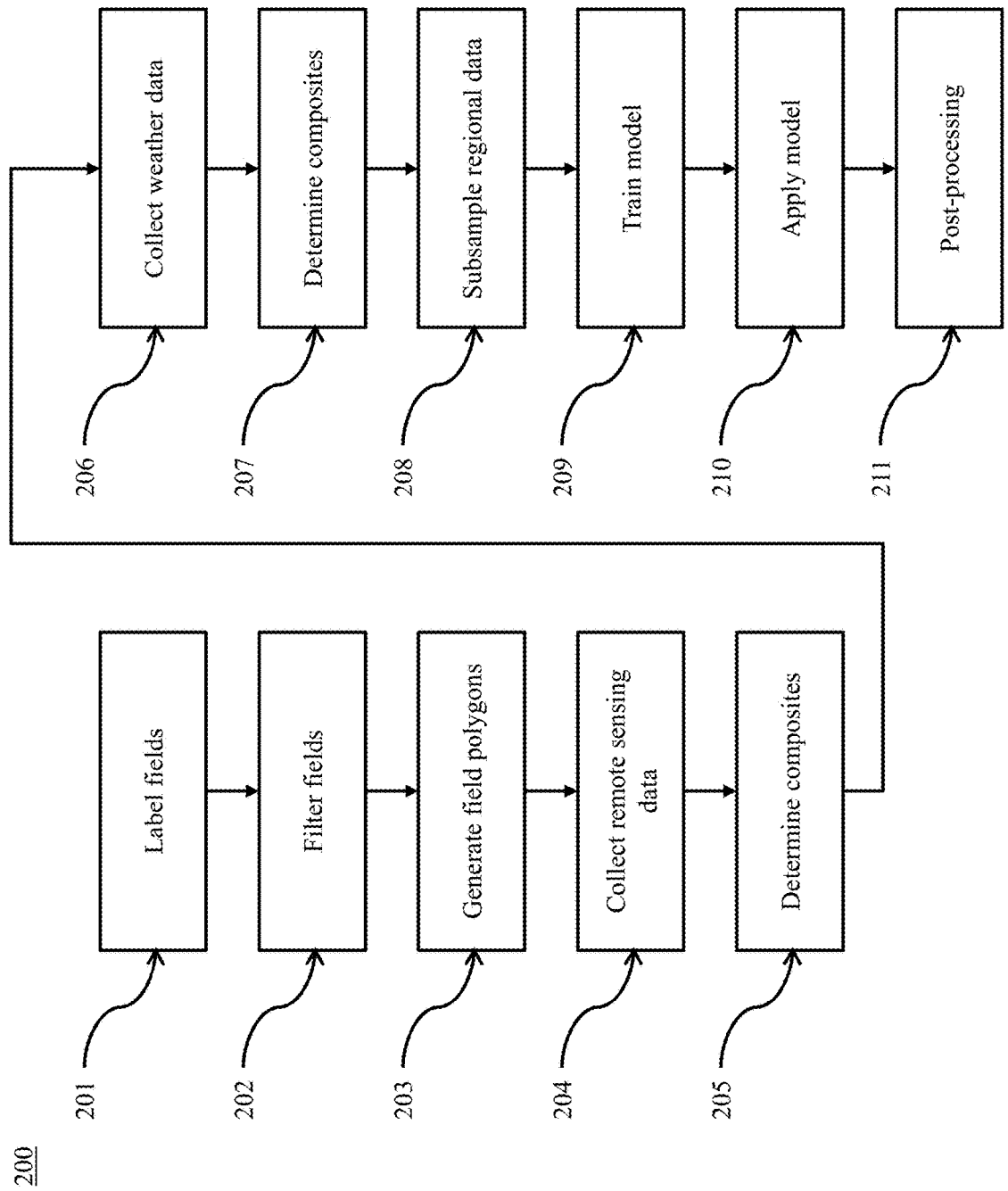
FIG. 2 illustrates a method of generating an irrigation map according to embodiments of the present disclosure.

Referring now to FIG. 2, a method of generating an irrigation map is illustrated according to embodiments of the present disclosure. Initially, irrigation labels are collected to serve as training data. At 201, each field within a training region is labeled with a binary value indicating whether irrigation is present. In some embodiment, to fill gaps in data availability, it is assumed that irrigation is present for all years of a training set if present for any of those years. At 202, the fields are filtered to those having crops of similar phenology stages. While the crop type itself is not used for training the model, the integrity of the training set requires that the crops in the training set are going through similar growth stages at the same time. For example, the vegetation indices of corn and soy in June in Iowa will be similar as these crops are in early stages of emergence, but winter wheat in the same region and time period would be starting to senesce prior to harvest. At 203, polygons are generated for fields containing irrigation.

At 204, pixel-level remote sensing data are collected. At 205, composites are determined for predetermined time periods (e.g., 2-month periods reflecting growth stage) and predetermined indices (e.g., brightness (reflectance), vegetation (NDVI, EVI2), wetness (NDWI)) derived from raw remote sensing data.

At 206, weather data is collected. In some embodiments, weather data is available at a regional level, such as a county. At 207, composites are determined for predetermined time periods (e.g., 2-month periods reflecting growth stage) and predetermined values (e.g., cumulative precipitation (PMM) and growing degree days (GDD)). At 208, the irrigation labels and/or weather data are subsampled to generate pixel level data from regional data.

At 209, a model is trained using a Boosted Tree classification algorithm (for example, an XGBoost Classifier or Gradient Boosted Machine Classifier). In various embodiments, the model is trained on pixel level data. Using pixel level data increases the number of samples fed into the model.

At 210, the trained model is applied to naïve data to determine outputs prediction of irrigation status at the pixel level. At 211, post-processing is performed. In some embodiments, post-processing comprises field-level smoothing of predictions. In particular, noisy model output is smoothed using field shape files. The proportion of pixel-level positive predictions within a field provide a measure of uncertainty in the field-level label assignment.

With reference now to FIGS. 3-22, exemplary result data are presented for the methods described herein.

In this example, 6,495 fields are considered with binary irrigation labels. Their shapes intersect with 677 analysis tiles. Retrieving their data for 2016/2017/2018 (treating each field-year as a unique data point but considering 2018 labels to be ground truth for 2016 and 2017 as well), yields 110,000,000 pixels of data. This amount of data tends to overflow the memory of an M4 EC2 instance, and isn't strictly necessary because so much data is nearly identical within single fields. Models were run with each field subsampled down to 1,000 pixels.

In this example, the features used for prediction were:
brt_early
brt_mid
brt_late
evi2_early
evi2_mid
evi2_late
ndvi_early
ndvi_mid
ndvi_late
ndwi_early
ndwi_mid
ndwi_late
AVG_GDD_SUM_10Y
AVG_PMM_SUM_10Y All brt, evi, ndvi, ndwi features were retrieved as tif files. AVG_GDD_SUM_10Y and AVG_PMM_SUM_10Y are the result of queries from existing data cache. They are averaged down to the tile level from county-level weather data.

GMM_SUM and PMM_SUM are available for the current year, but were not used in this example in order to have minimal data dependencies and the performance tradeoff for leaving them out seems small based on models run so far.

Model training is configurable to run either a Gradient Boosting Machine (GBM) from sklearn or an xgboost, based on a command line parameter, but is easily extensible to other models if desired. Flags allow for training under various circumstances, such as pivoting the weather data into columns like GDD_SUM_early, GDD_SUM_mid, etc., and running with and without current year weather.

In this example, a python script builds and saves weather data based on the geopandas dataframe of irrigation shapes and US county shapefiles, which takes a few minutes. A python script builds the rest of the features from tif files. It takes 3 hours on M4 EC2 for the 677 analysis tiles available summer '18.

Once the entire 110,000,000 pixel dataset is saved, separate data files are stored with each field subsampled down to a set number of pixels, e.g., 1000. Each field will contain either all of its pixels, if it is smaller than the given subsample count, or the desired count of pixels. This also serves to remove a dataset bias towards large fields.

Figure 3:
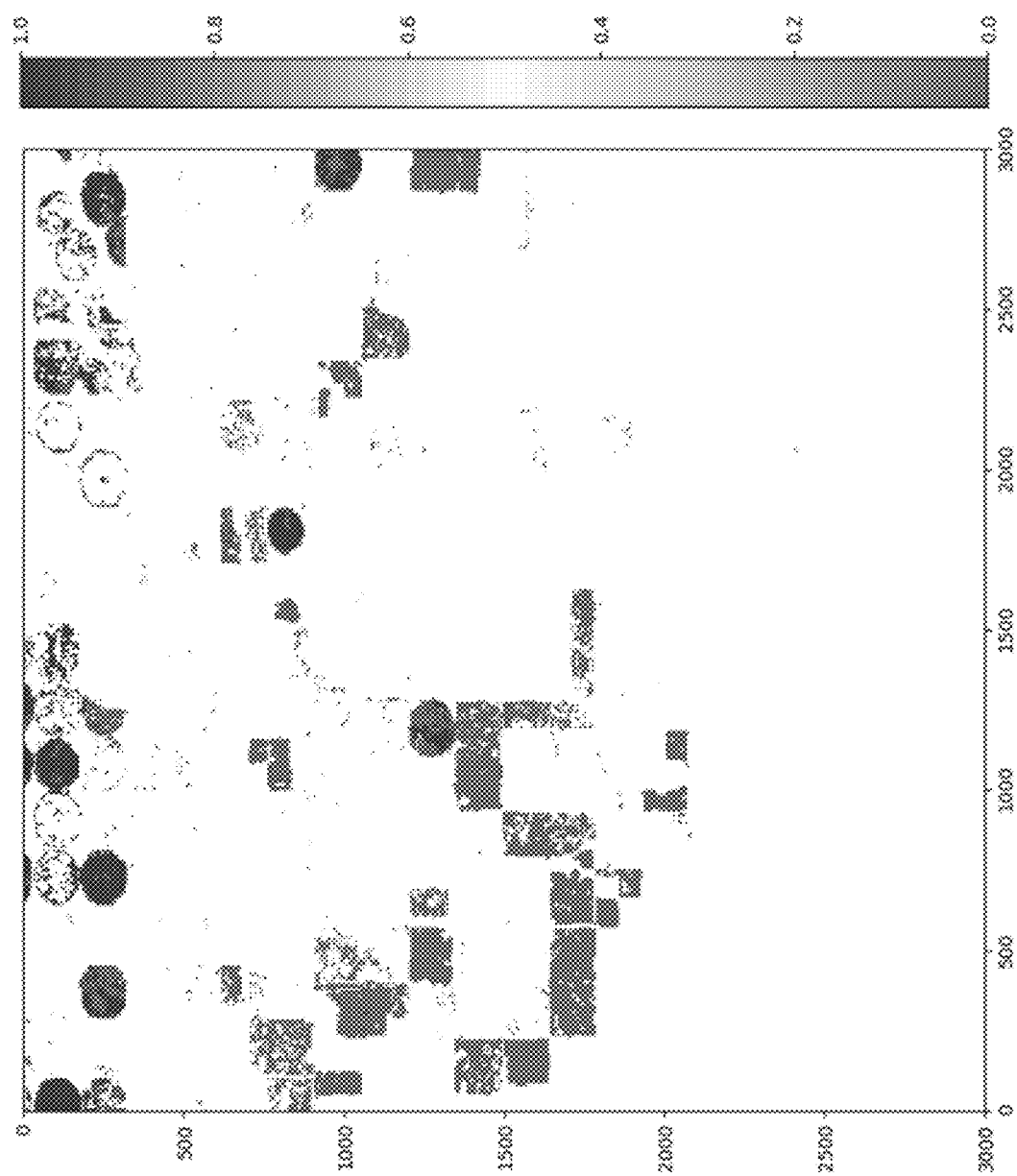
FIG. 3 is an exemplary output labeled map according to embodiments of the present disclosure.
Figure 4:
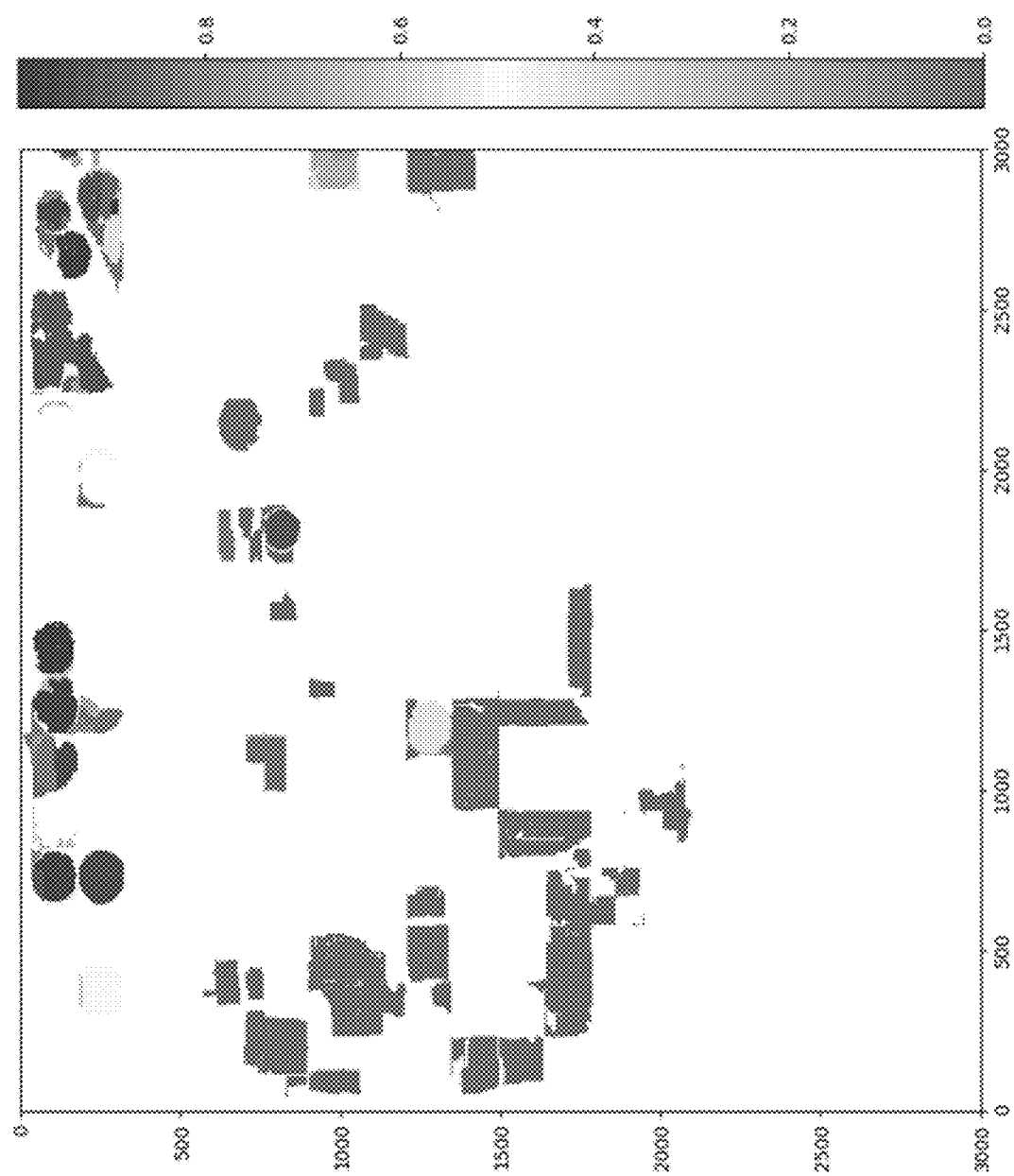
FIG. 4 is an exemplary output labeled map according to embodiments of the present disclosure.
Figure 5:
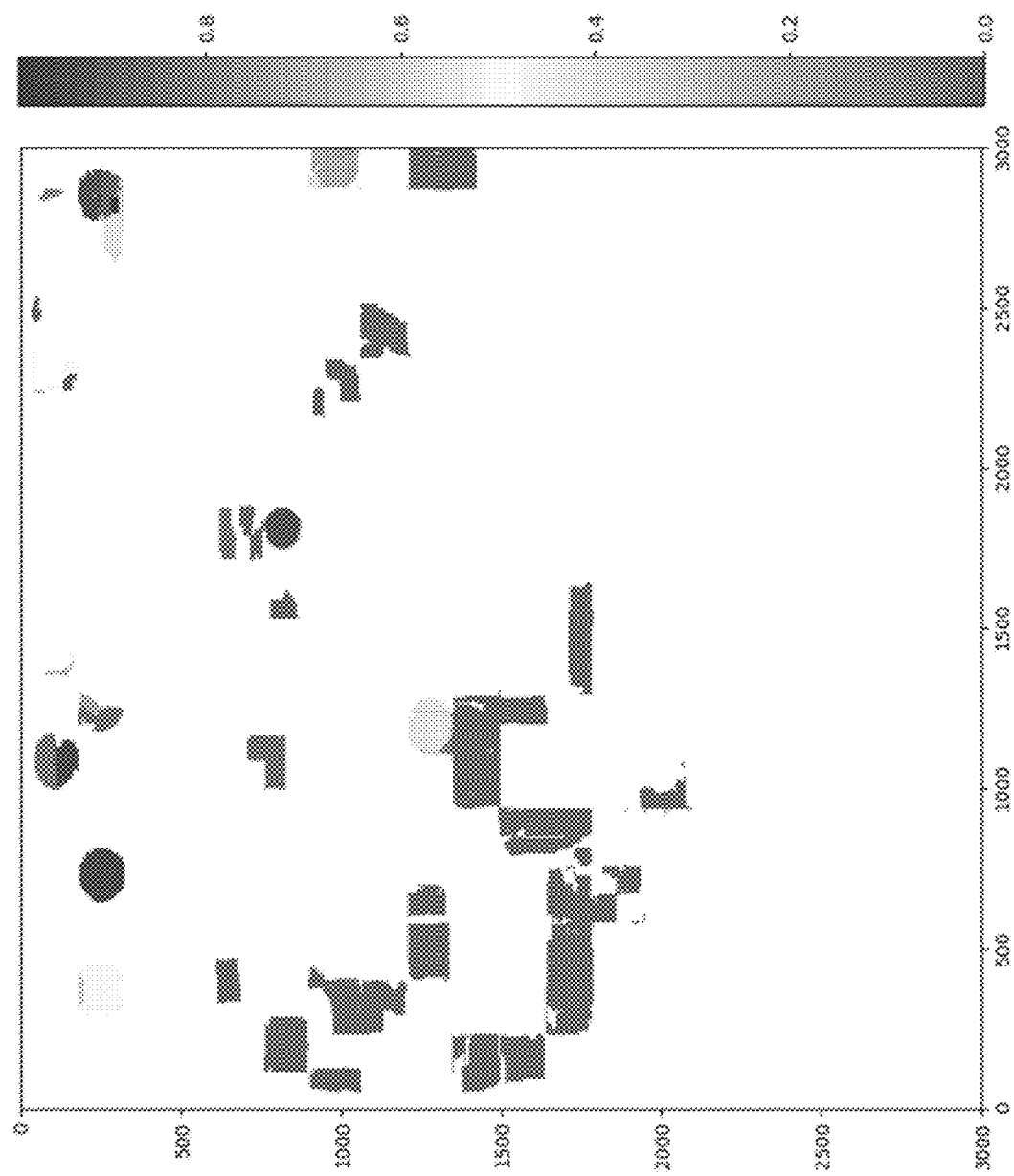
FIG. 5 is an exemplary output labeled map according to embodiments of the present disclosure.

Referring to FIGS. 3-5, examples are shown of field predictions under different prediction thresholds. In particular, the prediction threshold determined the proportion of pixels in a given field that must have irrigation predictions in order for a prediction to be made at the field level. This provides effective field-level smoothing. FIG. 3 shows exemplary outputs on the pixel level without smoothing, with predictions provided only on CDL pixels. FIG. 4 shows exemplary output for the same tile using a pixel threshold of 10% (based on auto-delineated field shapes). FIG. 5 exemplary output for the same tile using a pixel threshold of 50% (based on auto-delineated field shapes).

Three models are tested in this example, an xgboost model (with parameters described in Inset 1), a first GBM model (with parameters described in Inset 2), and a second GBM model (with parameters described in Inset 3, with the depth 5 option removed from the random search CV to look at the performance with depth held to 3).

---
Inset 1
---

XGBClassifier(base_score=0.5, booster='gbtree', colsample_bylevel=1,
    colsample_bytree=1, gamma=0, learning_rate=0.1,
max_delta_step=0,
    max_depth=5, min_child_weight=1, missing=nan,
n_estimators=100,
    n_jobs=1, nthread=None, objective='binary:logistic',
    random_state=25, reg_alpha=0, reg_lambda=1,
scale_pos_weight=1,
    seed=None, silent=None, subsample=0.2)

---
Inset 2
---

GradientBoostingClassifier(criterion='friedman_mse', init=None,
    learning_rate=0.1, loss='deviance', max_depth=5,
    max_features=None, max_leaf_nodes=None,
    min_impurity_decrease=0.0, min_impurity_split=None,
    min_samples_leaf=1, min_samples_split=2,
    min_weight_fraction_leaf=0.0, n_estimators=100,
    n_iter_no_change=None, presort='auto', random_state=25,
    subsample=0.2, tol=0.0001, validation_fraction=0.1,
    verbose=0, warm_start=False)

---
Inset 3
---

GradientBoostingClassifier(criterion='friedman_mse', init=None,
    learning_rate=0.1, loss='deviance', max_depth=3,
    max_features=None, max_leaf_nodes=None,
    min_impurity_decrease=0.0, min_impurity_split=None, ---
Inset 3
--- min_samples_leaf=1, min_samples_split=2,
    min_weight_fraction_leaf=0.0, n_estimators=300,
    n_iter_no_change=None, presort='auto', random_state=25,
    subsample=0.2, tol=0.0001, validation_fraction=0.1,
    verbose=0, warm_start=False)

---

Figure 6:
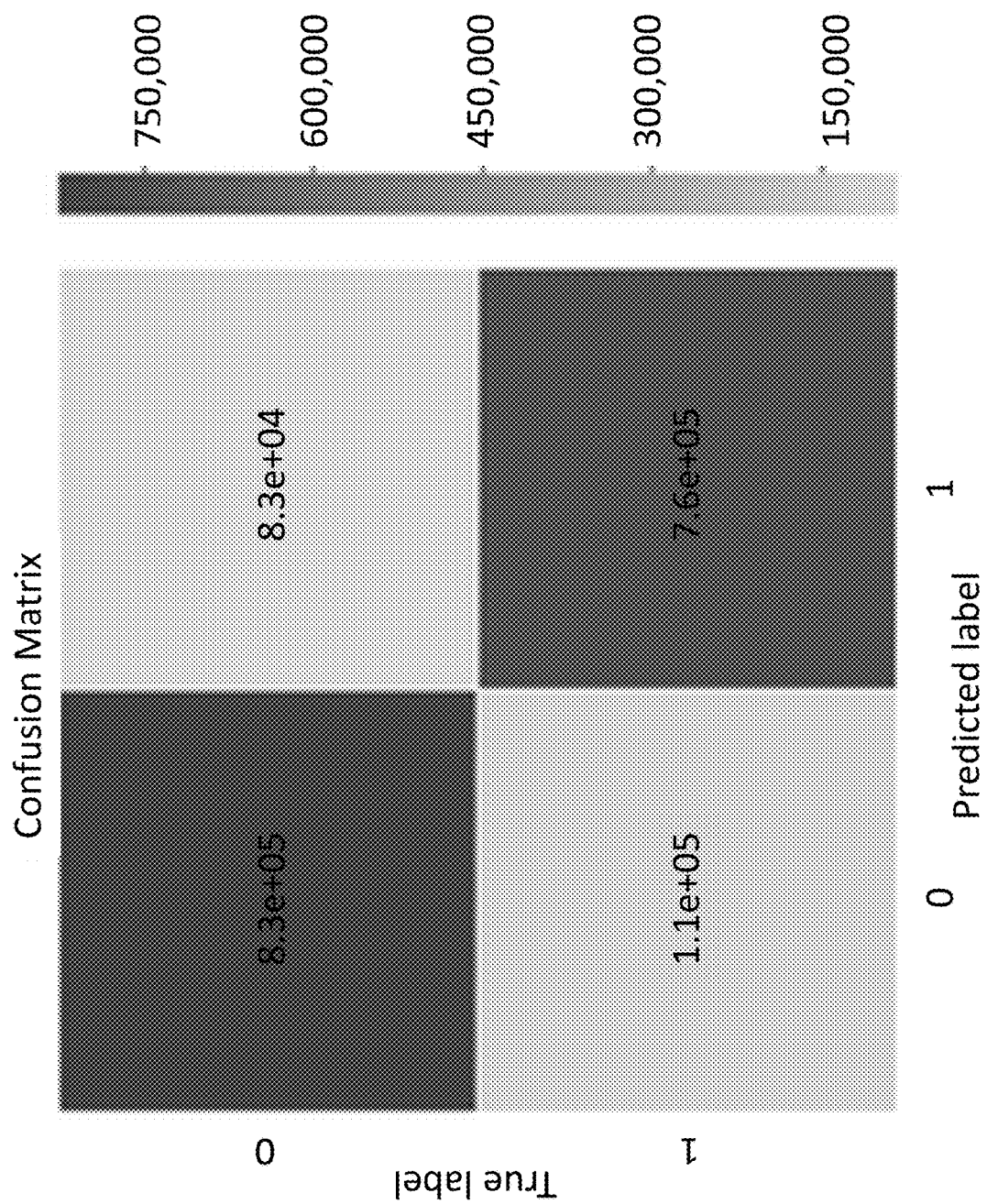
FIG. 6 is a confusion matrix of an exemplary embodiment according to the present disclosure.
Figure 7:
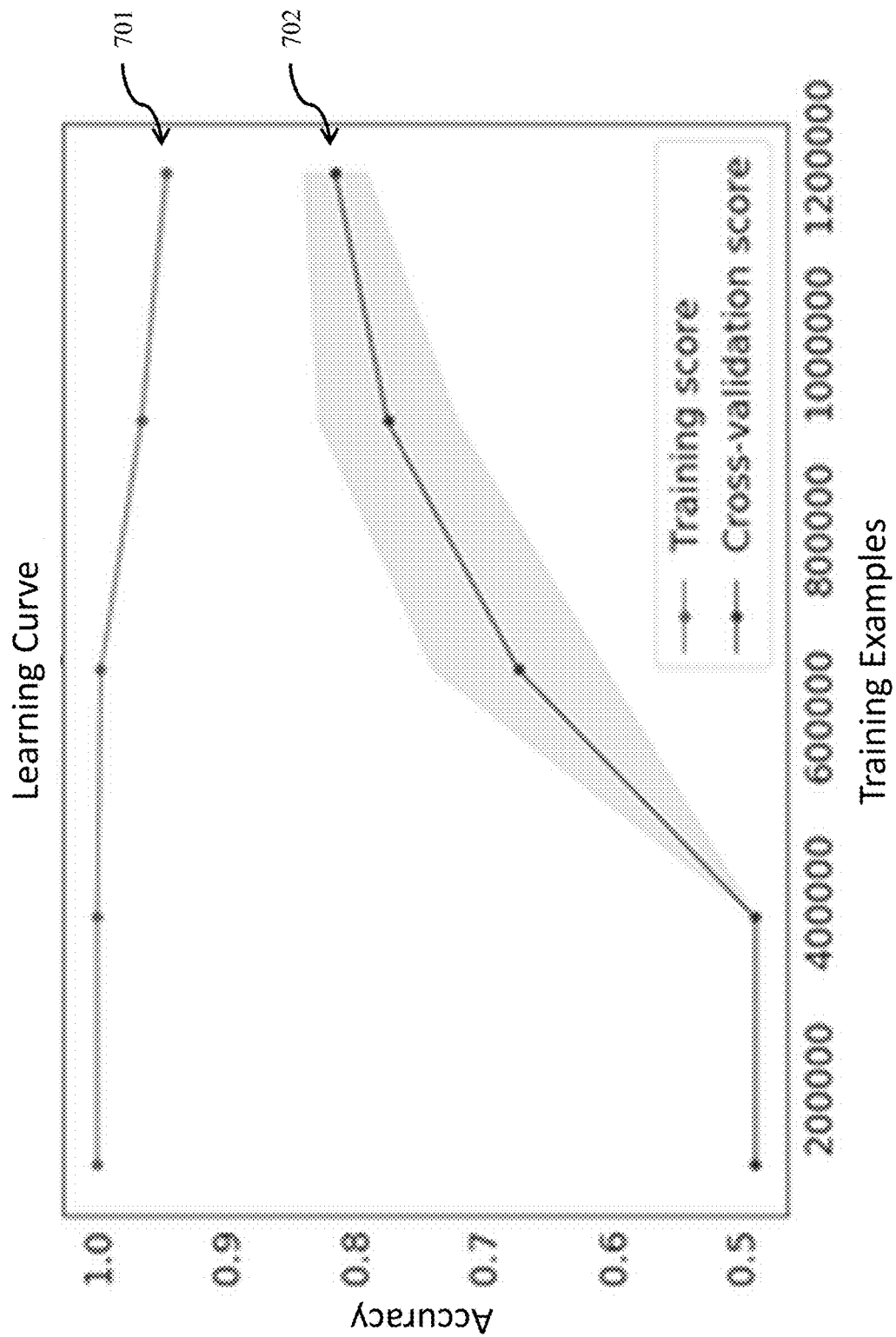
FIG. 7 is a graph of accuracy versus training examples of an exemplary embodiment according to the present disclosure.
Figure 8:
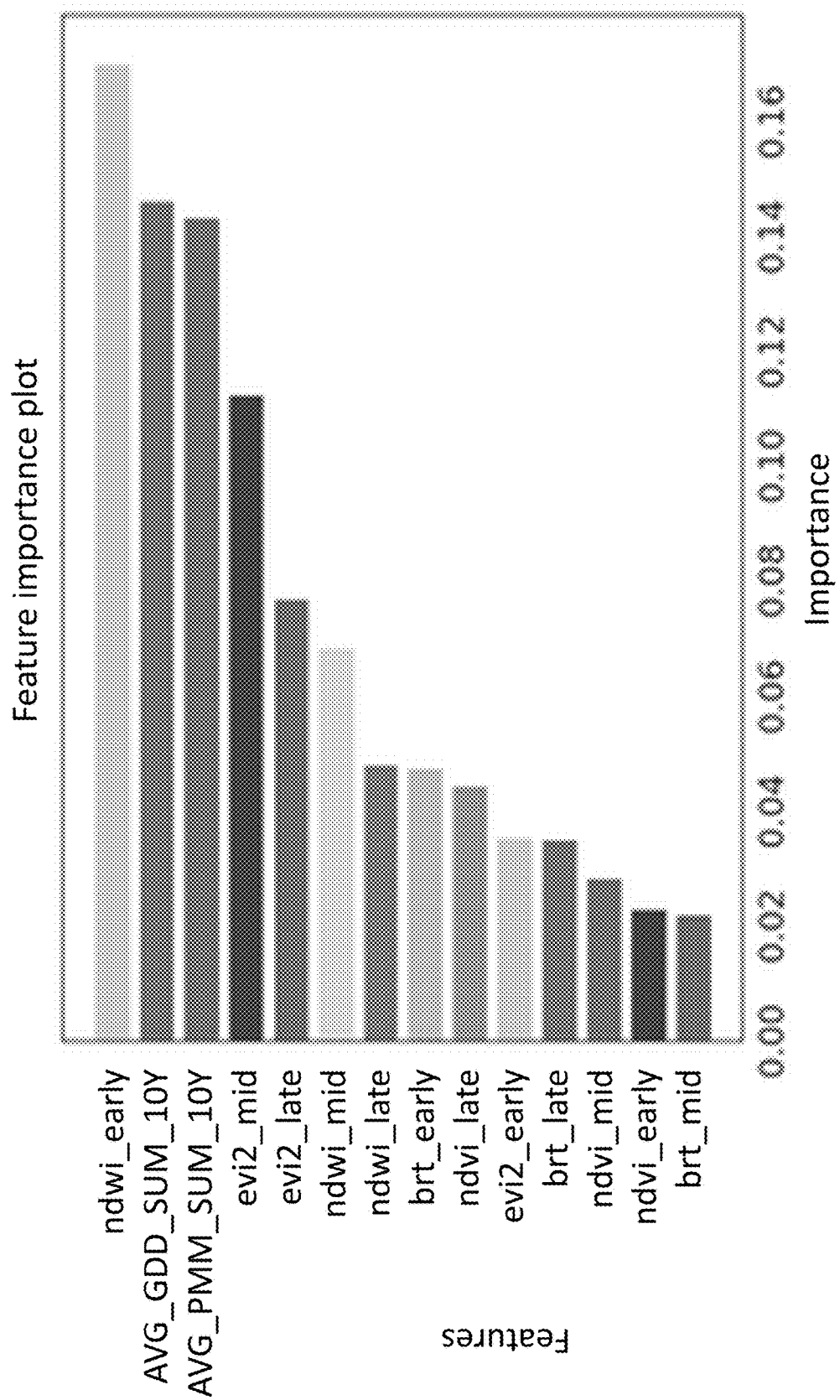
FIG. 8 is a feature importance plot of an exemplary embodiment according to the present disclosure.
Figure 9:
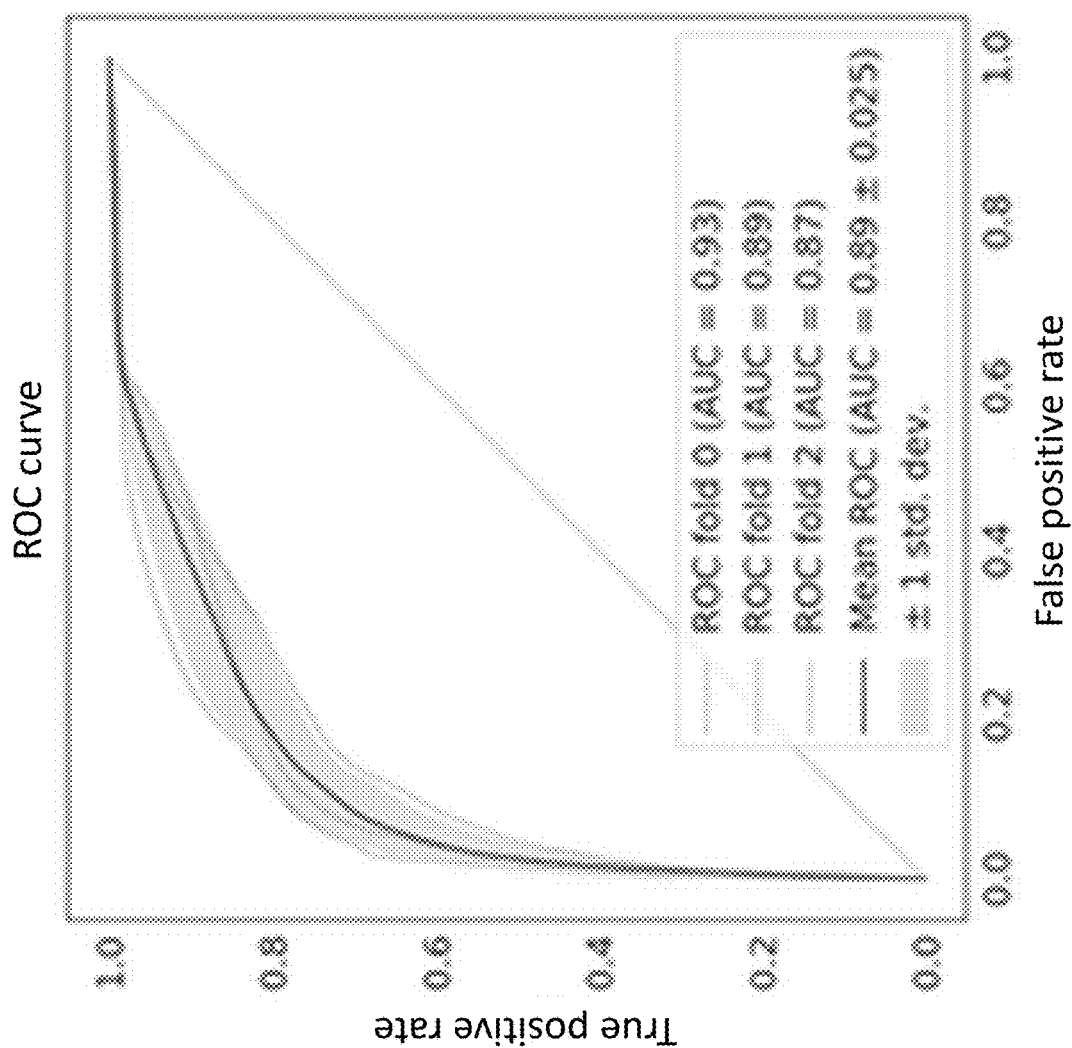
FIG. 9 is a graph of true positive rate versus false positive rate of an exemplary embodiment according to the present disclosure.

Referring to FIGS. 6-9 visualizations of results of the xgboost model on the example dataset described above are provided. FIG. 6 provides a confusion matrix. FIG. 7 provides a graph of accuracy versus training examples, where 701 correspond to the training score and 702 corresponds to the cross-validation score. FIG. 8 provides a feature importance plot. FIG. 9 provides a graph of true positive rate versus false positive rate.

Figure 10:
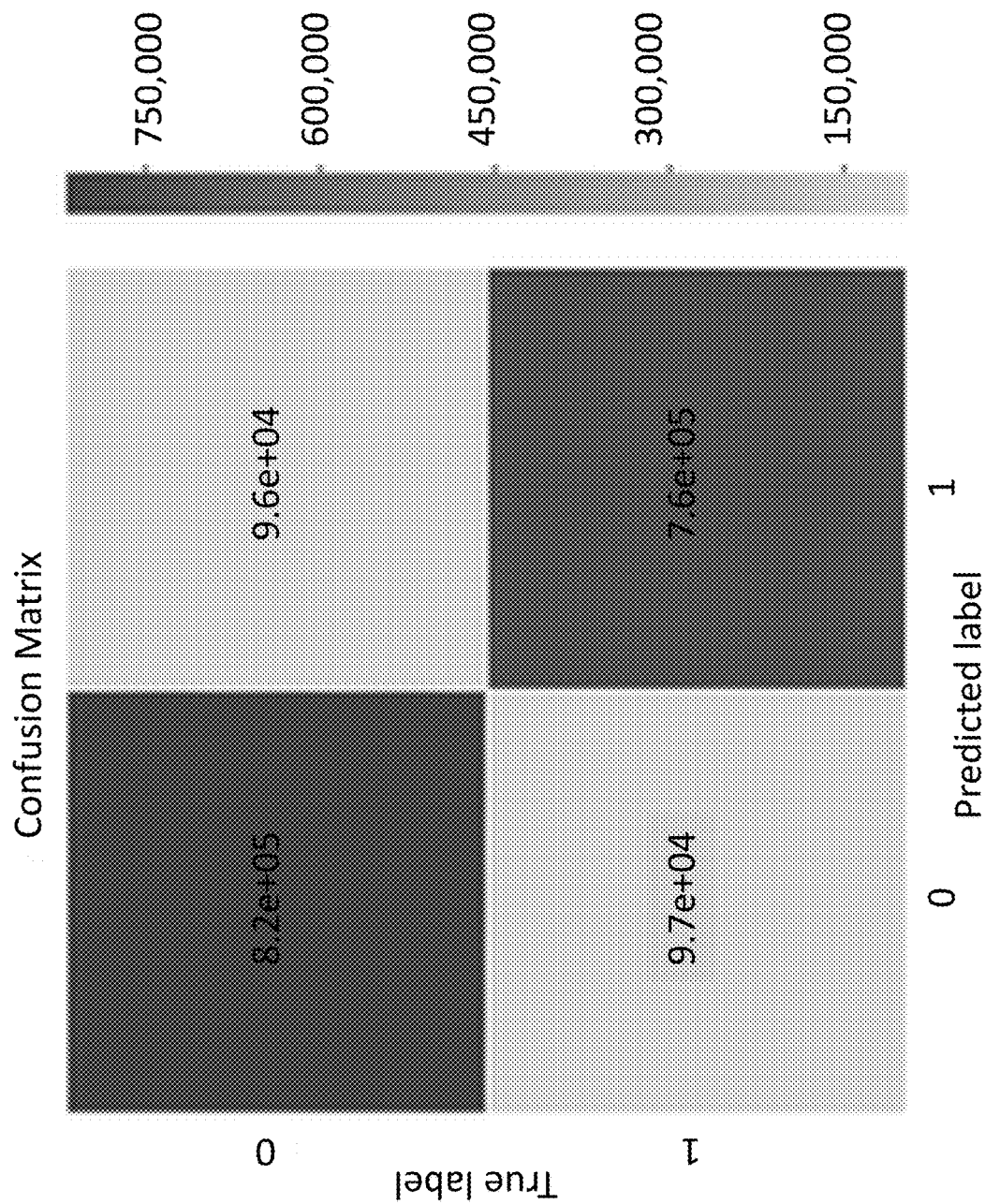
FIG. 10 is a confusion matrix of an exemplary embodiment according to the present disclosure.
Figure 11:
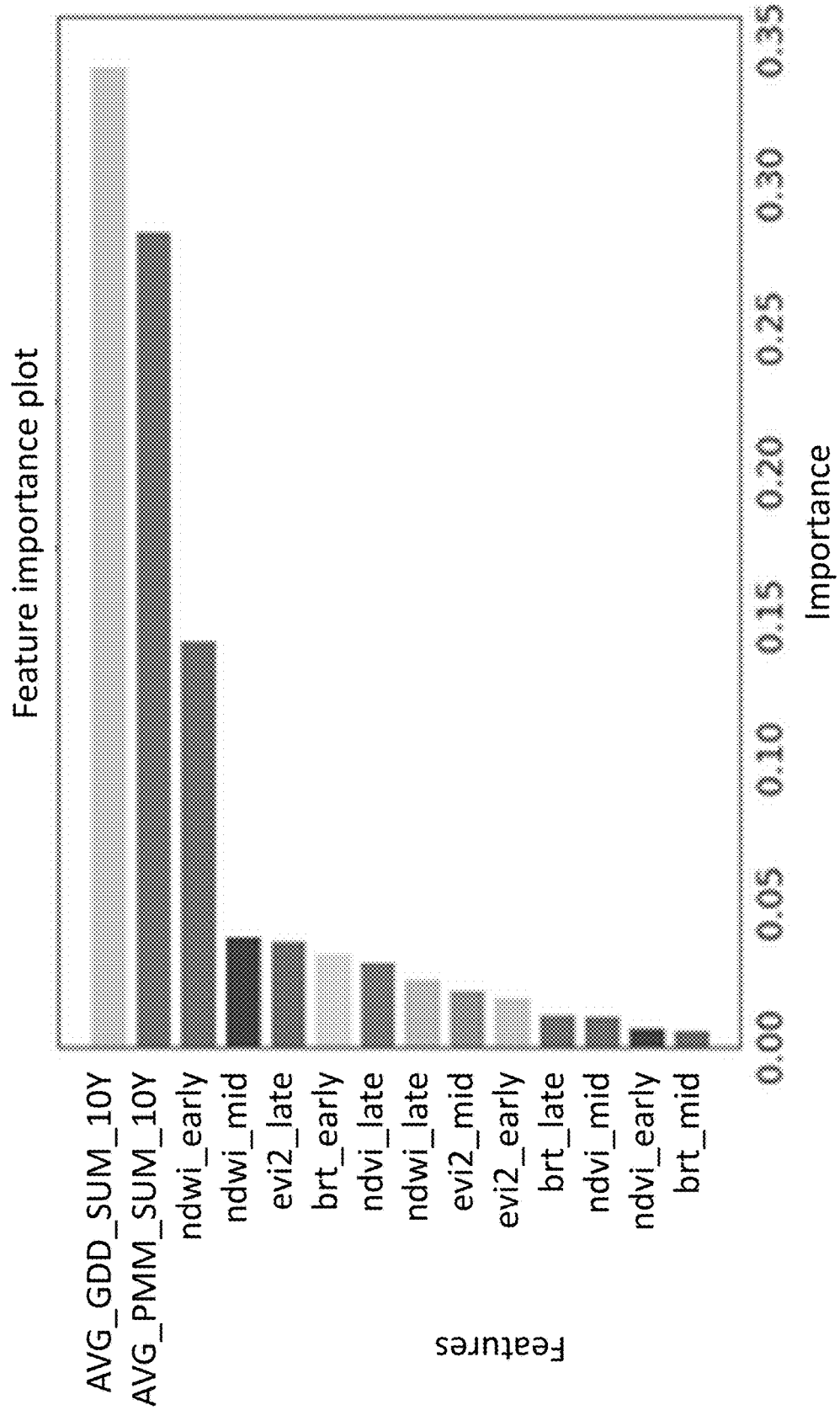
FIG. 11 is a feature importance plot of an exemplary embodiment according to the present disclosure.
Figure 12:
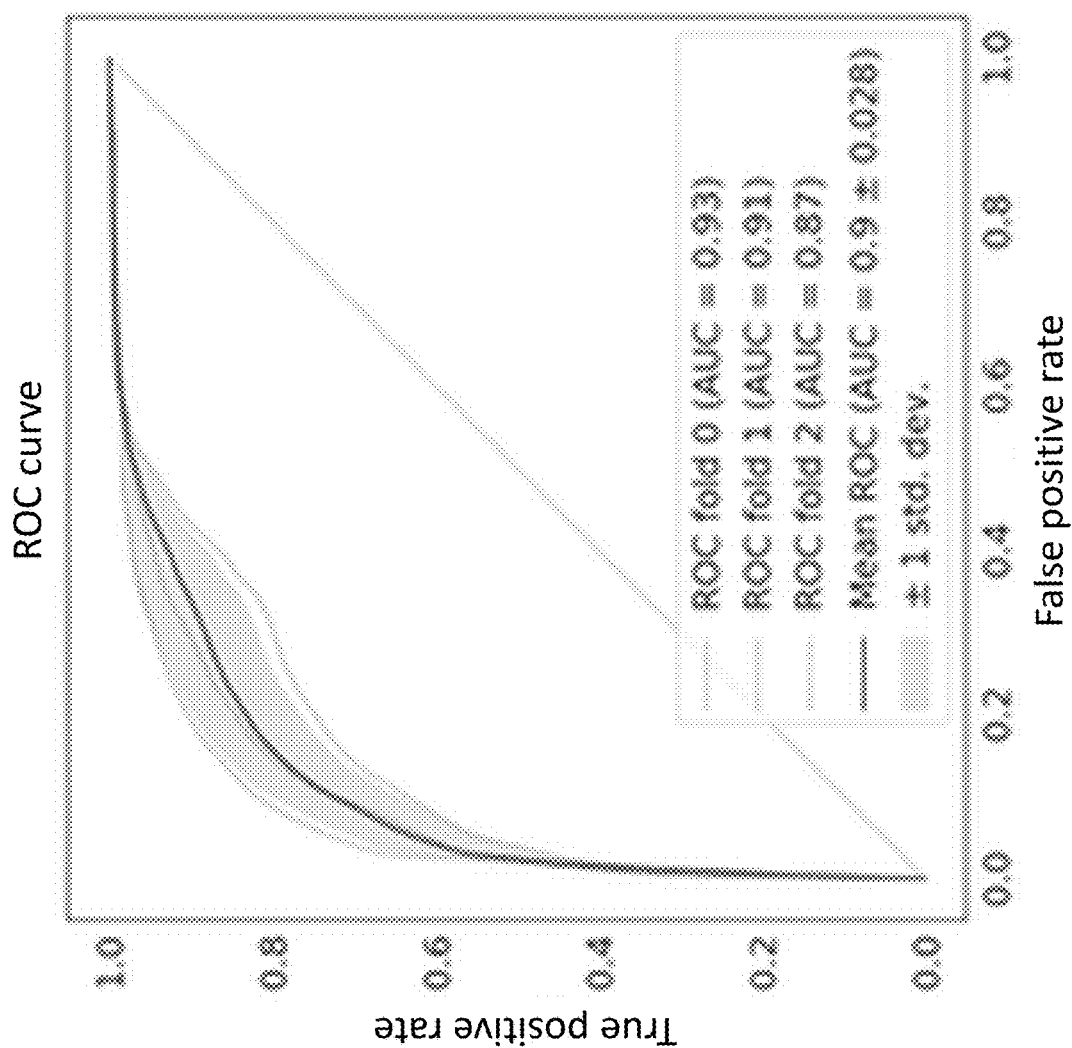
FIG. 12 is a graph of true positive rate versus false positive rate of an exemplary embodiment according to the present disclosure.

Referring to FIGS. 10-12 visualizations of results of the first GBM model (depth=5, n_estimators=100) on the example dataset described above are provided. FIG. 10 provides a confusion matrix. FIG. 11 provides a feature importance plot. FIG. 12 provides a graph of true positive rate versus false positive rate.

Figure 13:
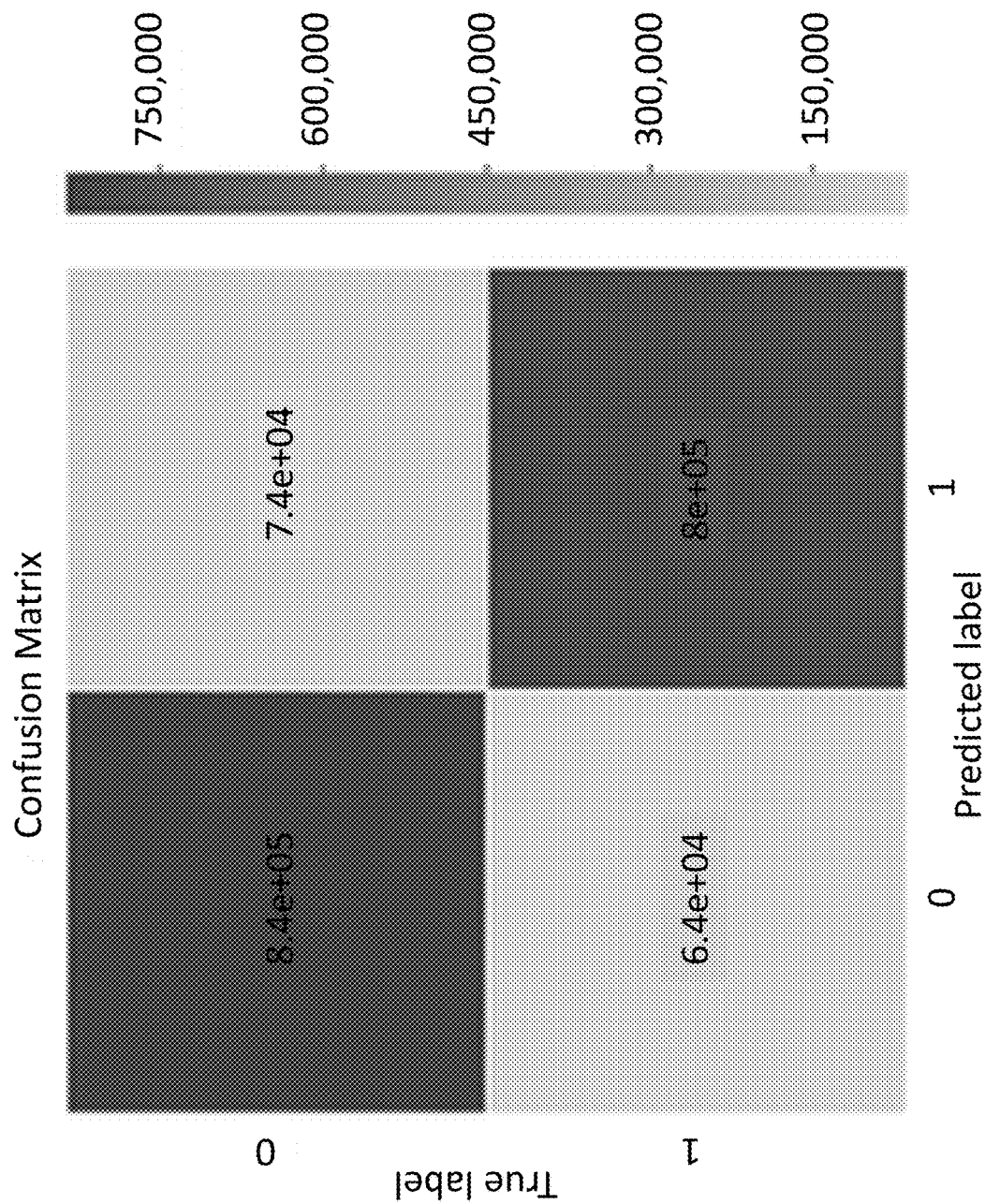
FIG. 13 is a confusion matrix of an exemplary embodiment according to the present disclosure.
Figure 14:
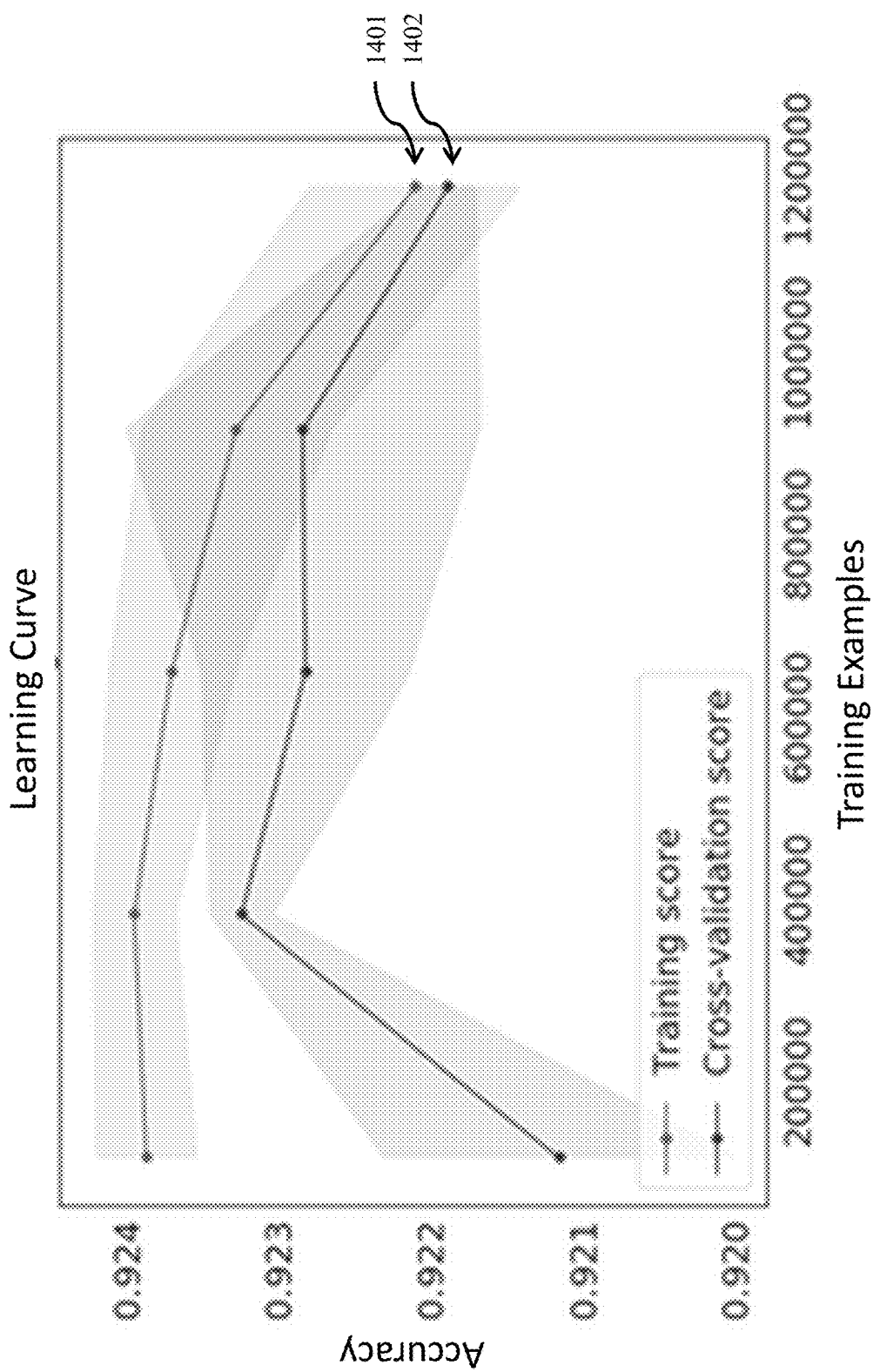
FIG. 14 is a graph of accuracy versus training examples of an exemplary embodiment according to the present disclosure.
Figure 15:
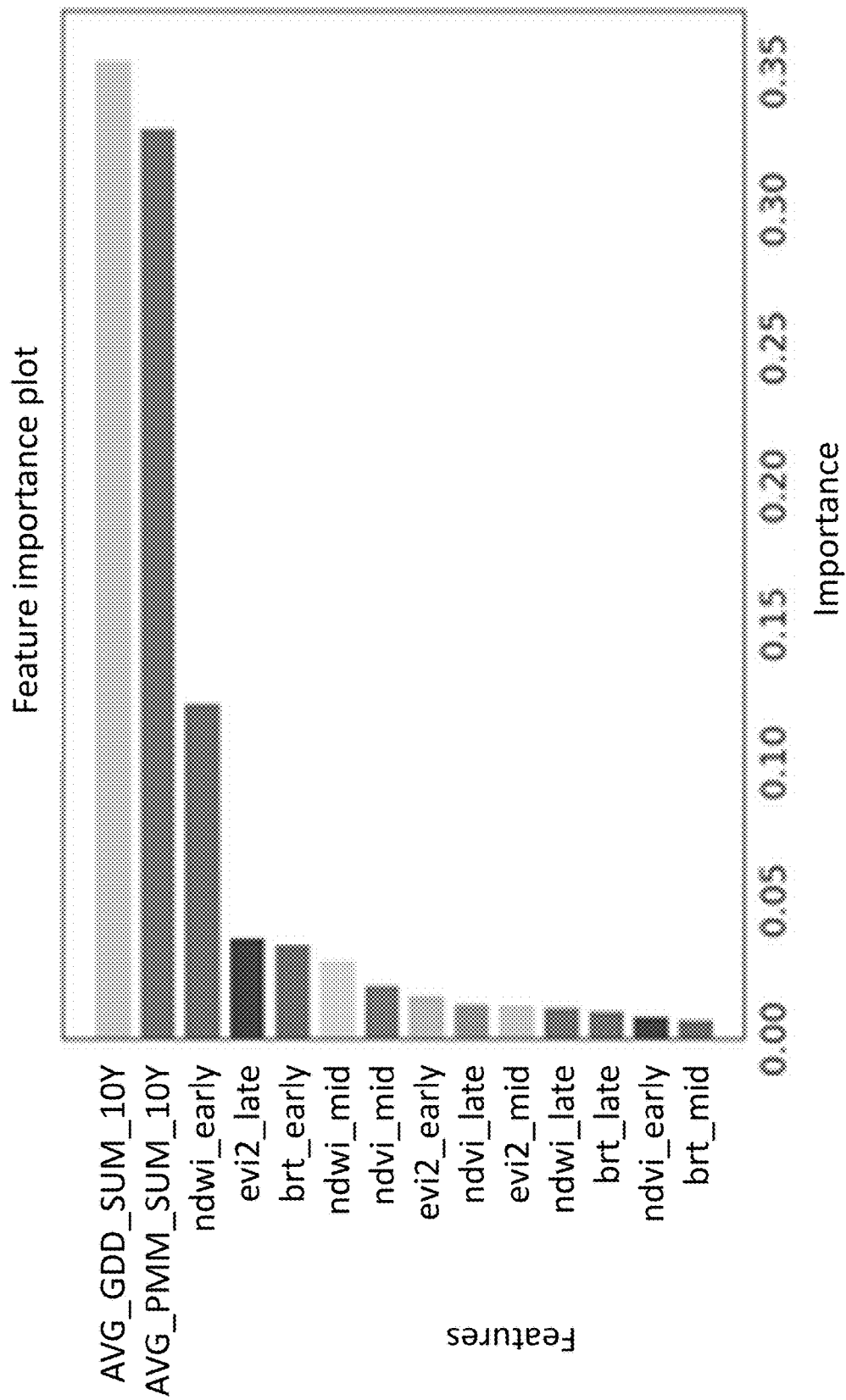
FIG. 15 is a feature importance plot of an exemplary embodiment according to the present disclosure.
Figure 16:
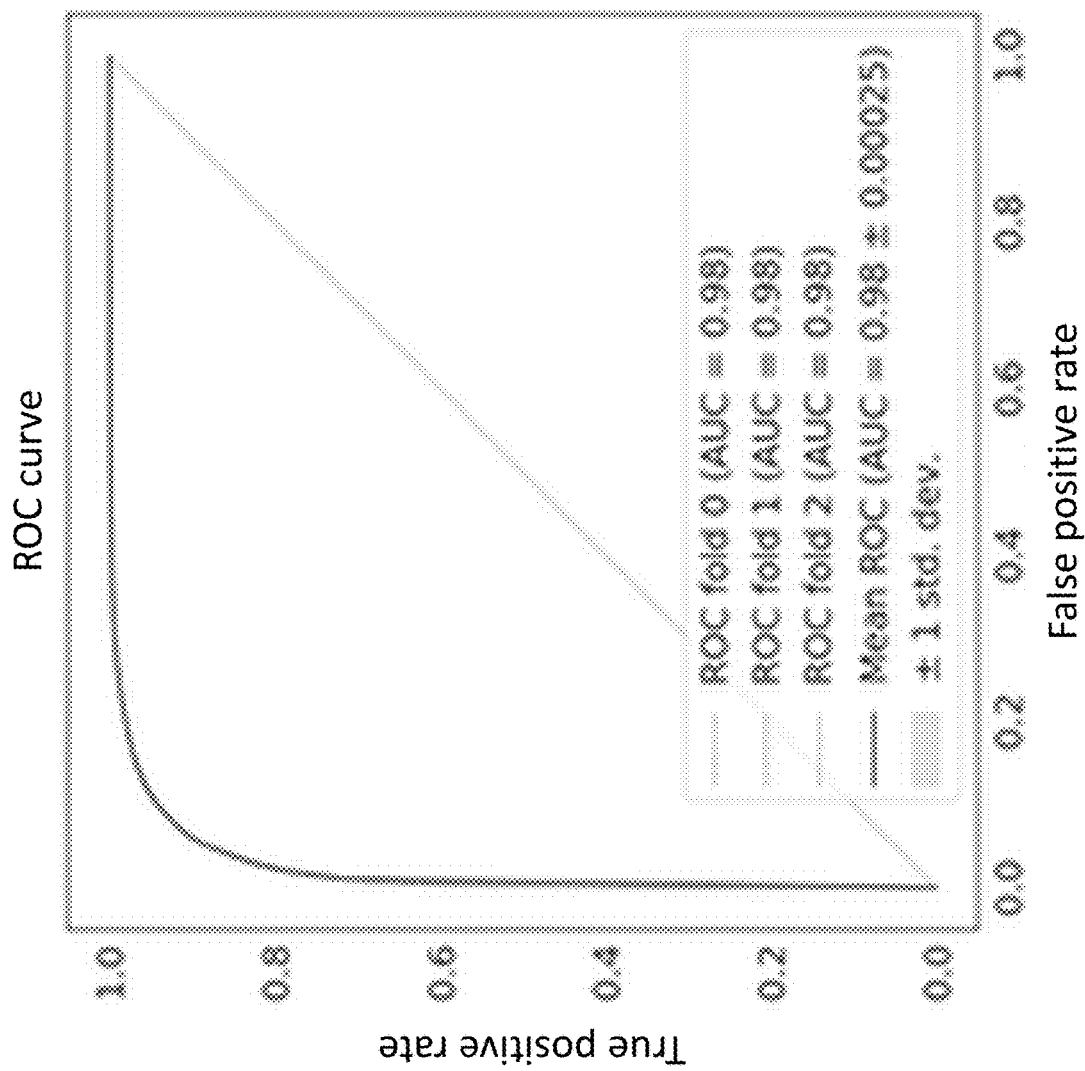
FIG. 16 is a graph of true positive rate versus false positive rate of an exemplary embodiment according to the present disclosure.

Referring to FIGS. 13-16 visualizations of results of the second GBM model (rerun 8-19, depth=3 n_estimators=300) on the example dataset described above are provided. FIG. 13 provides a confusion matrix. FIG. 14 provides a graph of accuracy versus training examples, where 1401 correspond to the training score and 1402 corresponds to the cross-validation score. FIG. 15 provides a feature importance plot. FIG. 16 provides a graph of true positive rate versus false positive rate.

Figure 17:
FIG. 17 is an exemplary output labeled map according to embodiments of the present disclosure.

Referring to FIG. 17, an exemplary irrigation map is provided generated in this example.

Figure 18:
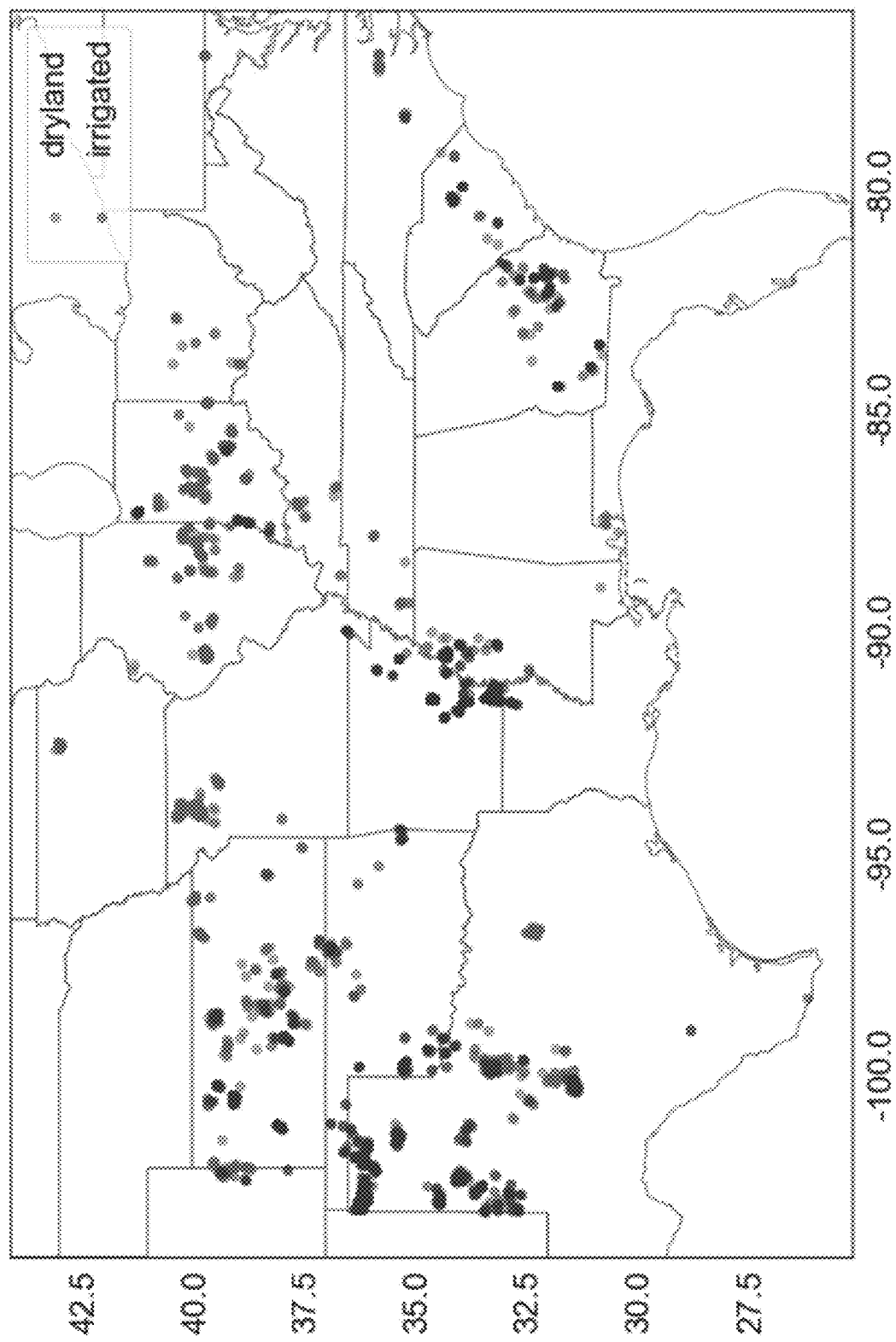
FIG. 18 is a map of exemplary irrigation labels of an exemplary embodiment according to the present disclosure.

Referring to FIG. 18, a map is provided of exemplary irrigation labels for fields planted with corn, soybeans, or cotton in 2018. This set of 6,495 to fields provides the training set in this example. As noted above, this training set mixes crops that have the same phenology stage.

Figure 19:
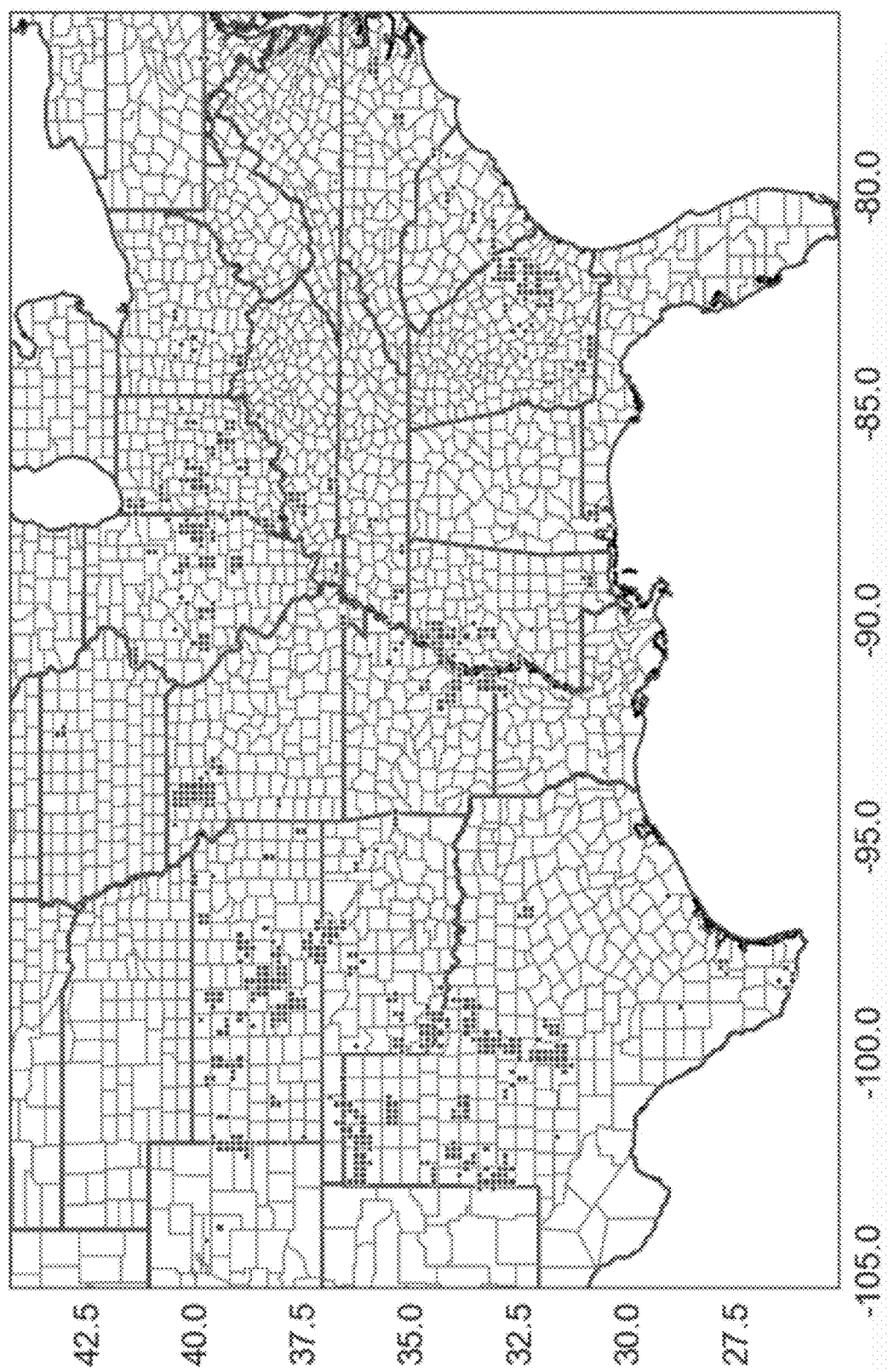
FIG. 19 is a map of analysis tiles containing labeled fields of an exemplary embodiment according to the present disclosure.

Referring to FIG. 19, a map is provided of 677 analysis tiles containing labeled fields used in this example. The data are at a 30 m resolution, with actual pixel dimensions of <10 m, ~5 m near the equator and ~8 m overall.

Figure 20:
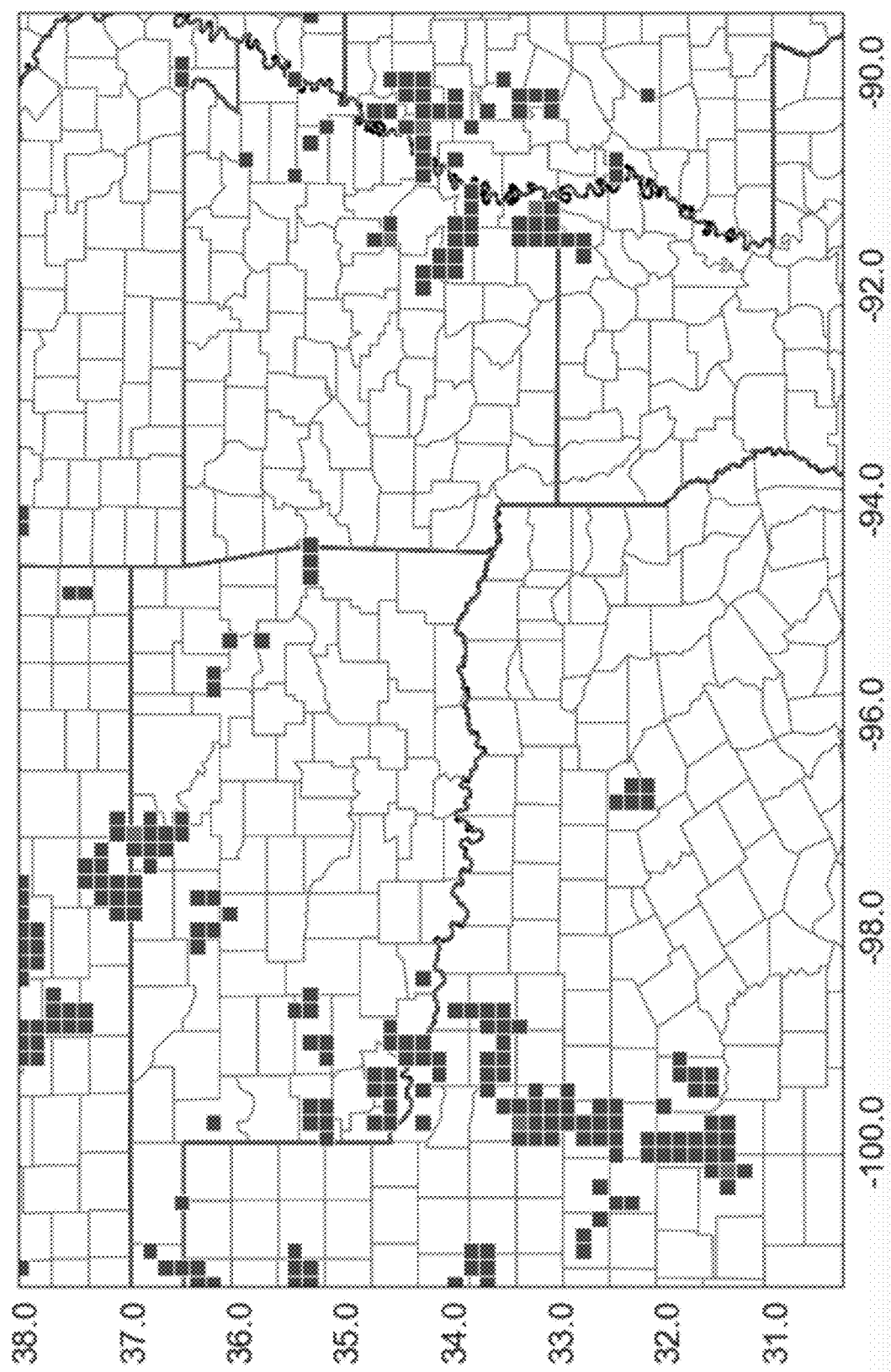
FIG. 20 is a map of a subset of six tiles containing labeled fields of an exemplary embodiment according to the present disclosure.

Referring to FIG. 20, a map is provided of a subset of 6 tiles containing labeled fields used in this example as a training set. These tiles are each 0.5 degrees and contain different geographies.

As described above, in this example, remote sensing data is considered over three years: 2016, 2017, 2018 and over three time windows: early (April-May), mid (June-July), late (August-September). NASS Cropland Data Layer is used to extract pixels for corn, cotton and soybeans. Features include pixel brightness (BRT), two vegetation indices (NDVI and evi2), and a water index (NDWI).

For weather data, accumulated precipitation, accumulated Growing Degree Days are considered over three time windows: early-, mid-, and late-season over three years: 2016, 2017, 2018 and 10 year averages (2008-2018).

As discussed above, the NASS Cropland Data Layer is used to extract pixels for corn, cotton and soybeans. Extracted features are used for classification rather than raw satellite image. Weather data allows determination of whether a field is green and wet due to precipitation or irrigation. Weather also provides a proxy for geography. In particular, the ten-year average controls for extreme weather events.

As noted above, the model operates at the pixel level while truth is provided at a field level.

Figure 21:
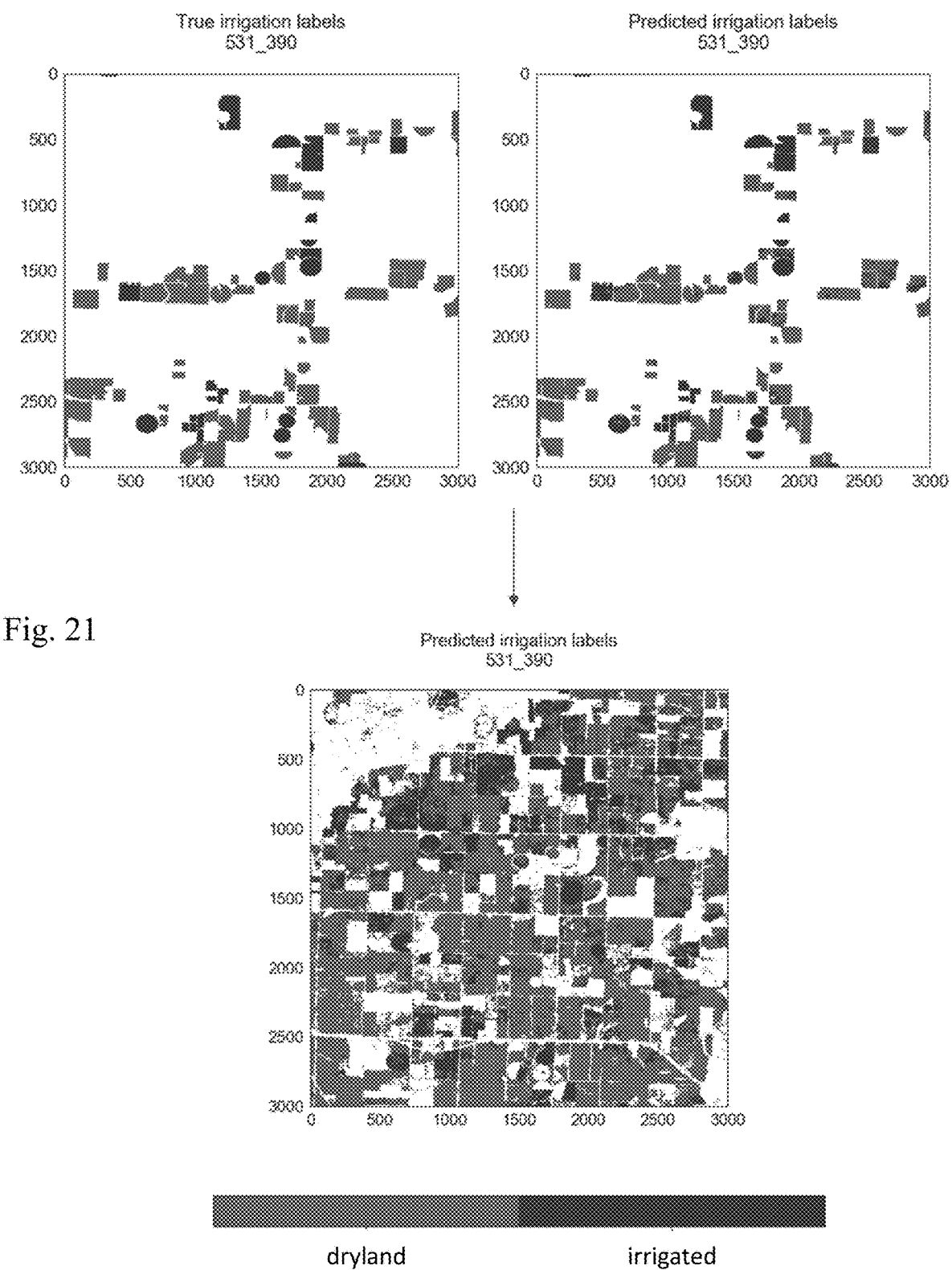
FIG. 21 shows exemplary output labeled maps according to embodiments of the present disclosure.

Referring to FIG. 21, an exemplary prediction is provided for a given tile. True and predicted labels are shown at left for field with available ground truth data. A very high accuracy of prediction may be observed. At right, a prediction map is provided for the entire tile, including fields for which ground truth is unavailable.

Figure 22:
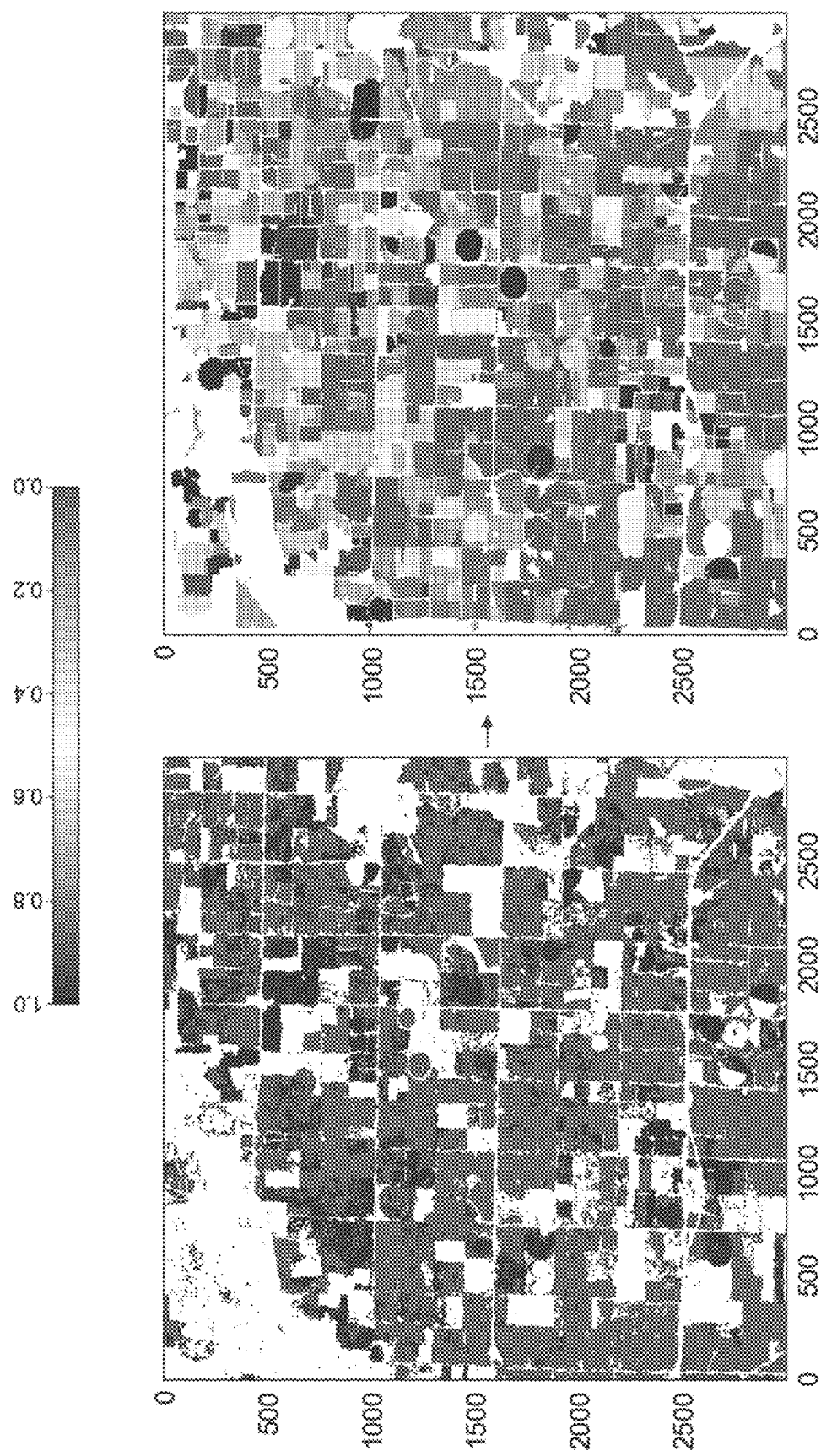
FIG. 22 shows exemplary output labeled maps according to embodiments of the present disclosure.

Referring to FIG. 22, field level smoothing of predictions is illustrated. In this example, the noisy model output (at left) is smoothed using field shapefiles and aggregating the predictions within the field. The proportion of pixel-level positive predictions within a field provide a measure of uncertainty in the field-level label assignment.

Figure 23:
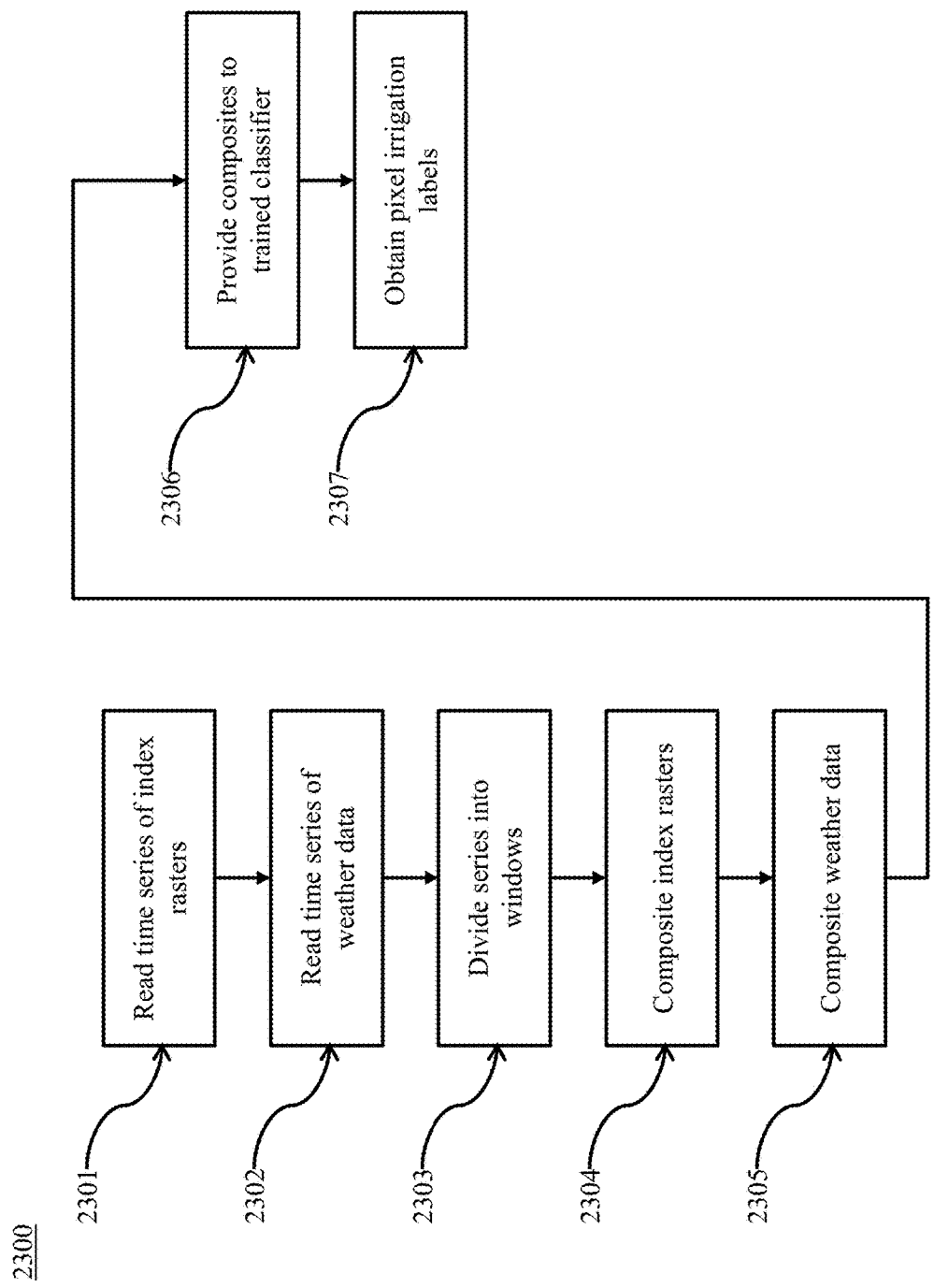
FIG. 23 illustrates a method for irrigation labeling according to embodiments of the present disclosure.

Referring to FIG. 23, a method of irrigation labeling is illustrated according to embodiments of the present disclosure. At 2301, at least one time series of index rasters for a geographic region is read. At 2302, a time series of weather data for the geographic region is read. At 2303, the at least one time series of index rasters and the time series of weather data are divided into a plurality of time windows. At 2304, the at least one time series of index rasters is composited within each of the plurality of time windows, yielding a composite index raster for each of the at least one time series of index rasters in each of the plurality of time windows. At 2305, the time series of weather data is composited within each of the plurality of time windows, yielding composite weather data in each of the plurality of time windows. At 2306, the composite index rasters and composite weather data are provided to a trained classifier. At 2307, a pixel irrigation label for each pixel of the composite index rasters is obtained therefrom. Each pixel irrigation label indicates the presence or absence of irrigation at the associated pixel.

Figure 24:
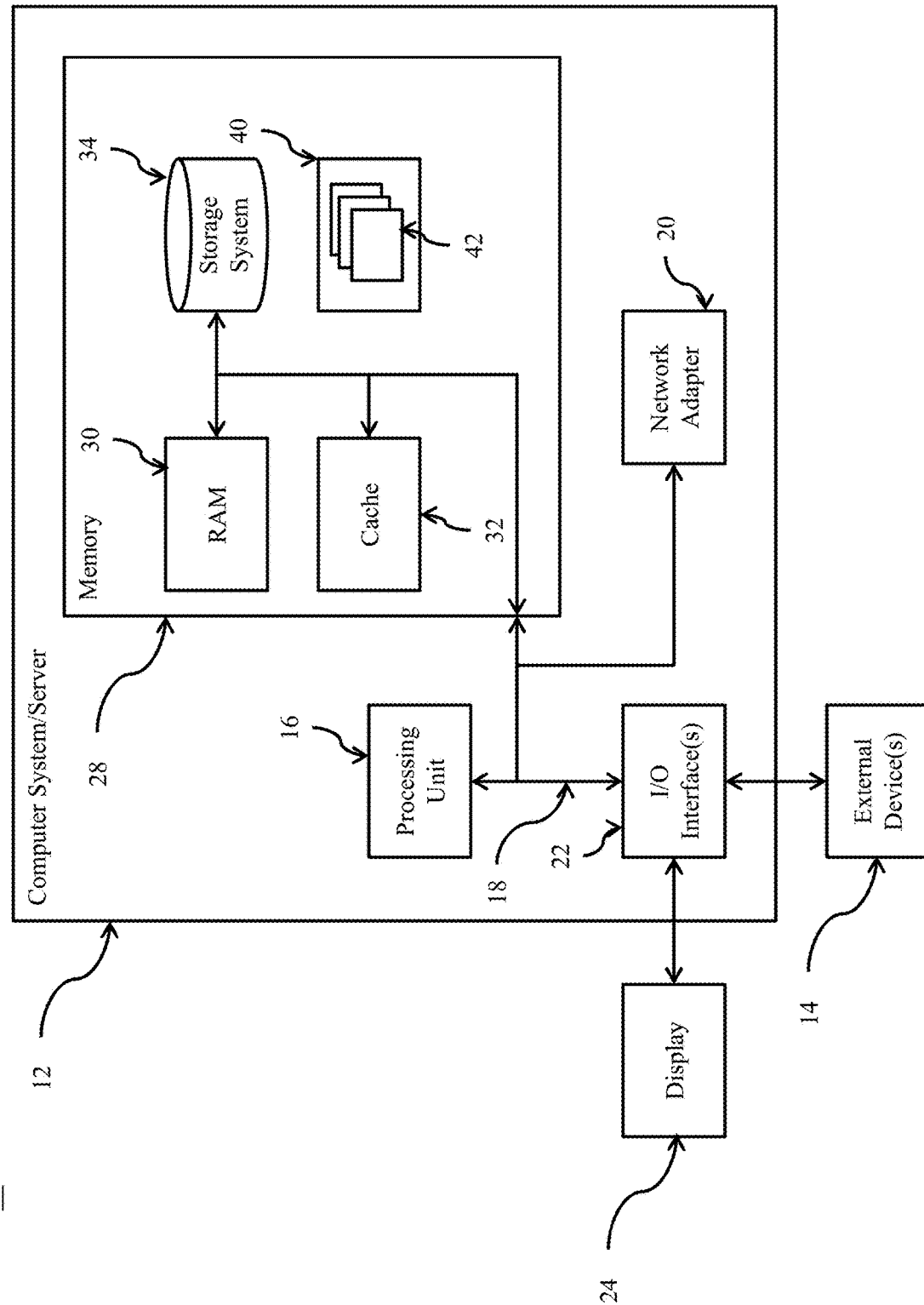
FIG. 24 depicts a computing node according to embodiments of the present disclosure.

Referring now to FIG. 24, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 24, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading at least one time series of index rasters for a geographic region;
reading a time series of weather data for the geographic region;
dividing the at least one time series of index rasters and the time series of weather data into a plurality of time windows;
compositing the at least one time series of index rasters within each of the plurality of time windows, yielding a composite index raster for each of the at least one time series of index rasters in each of the plurality of time windows;
compositing the time series of weather data within each of the plurality of time windows, yielding composite weather data in each of the plurality of time windows; and
providing the composite index rasters and composite weather data to a trained classifier, and obtaining therefrom a pixel irrigation label for each pixel of the composite index rasters, each pixel irrigation label indicating the presence or absence of irrigation at the associated pixel.

2. The method of claim 1, further comprising:
reading a plurality of field regions within the geographic region; and
determining a consensus irrigation label for each of the plurality of field regions based on the pixel irrigation labels within the respective field region.

3. The method of claim 2, further comprising:
determining an uncertainty of each consensus irrigation label based on the ratio of pixel irrigation labels indicating the presence of irrigation to pixel irrigation labels indicating absence of irrigation within the respective field region.

4. The method of claim 1, further comprising:
reading a time series of surface reflectance rasters for the geographic region; and
determining, for each of the surface reflectance rasters, at least one index raster, yielding the at least one time series of index rasters.

5. The method of claim 1, wherein the plurality of time windows are consecutive.

6. The method of claim 1, wherein the trained classifier comprises an ensemble model.

7. The method of claim 6, wherein the ensemble model comprises a plurality of decision trees.

8. The method of claim 6, wherein the ensemble model comprises a plurality of boosted tree models.

9. The method of claim 1, wherein the time series of surface reflectance rasters comprises satellite data.

10. The method of claim 1, wherein the time series of surface reflectance rasters spans a growing season in the geographic region.

11. The method of claim 1, wherein the at least one index raster comprises a normalized difference vegetation index raster.

12. The method of claim 1, wherein the at least one index raster comprises a land surface water index raster.

13. The method of claim 1, wherein the at least one index raster comprises a mean brightness raster.

14. The method of claim 1, wherein the time series of weather data comprises accumulated precipitation.

15. The method of claim 1, wherein the time series of weather data comprises growing degree days.

16. The method of claim 1, wherein the plurality of consecutive time windows correspond to early, mid-, and late phases of a growing season in the geographic region.

17. The method of claim 1, wherein compositing comprises averaging the at least one time series of index rasters within each of the plurality of time windows.

18. A system comprising:
a computing node comprising a computer readable storage medium having program instructions embodied therewith, the program instructions executable by a processor of the computing node to cause the processor to perform a method comprising:
reading at least one time series of index rasters for a geographic region;
reading a time series of weather data for the geographic region;
dividing the at least one time series of index rasters and the time series of weather data into a plurality of time windows;
compositing the at least one time series of index rasters within each of the plurality of time windows, yielding a composite index raster for each of the at least one time series of index rasters in each of the plurality of time windows;
compositing the time series of weather data within each of the plurality of time windows, yielding composite weather data in each of the plurality of time windows; and
providing the composite index rasters and composite weather data to a trained classifier, and obtaining therefrom a pixel irrigation label for each pixel of the composite index rasters, each pixel irrigation label indicating the presence or absence of irrigation at the associated pixel.

19. A computer program product for irrigation labeling, the computer program product comprising a computer readable storage medium having program instructions embodied therewith, the program instructions executable by a processor to cause the processor to perform a method comprising:
reading at least one time series of index rasters for a geographic region;
reading a time series of weather data for the geographic region;
dividing the at least one time series of index rasters and the time series of weather data into a plurality of time windows;
compositing the at least one time series of index rasters within each of the plurality of time windows, yielding a composite index raster for each of the at least one time series of index rasters in each of the plurality of time windows;

compositing the time series of weather data within each of the plurality of time windows, yielding composite weather data in each of the plurality of time windows; and providing the composite index rasters and composite weather data to a trained classifier, and obtaining therefrom a pixel irrigation label for each pixel of the composite index rasters, each pixel irrigation label indicating the presence or absence of irrigation at the associated pixel.

* * * * *